US012770510B2

(12) United States Patent
Komiyama

(10) Patent No.: US 12,770,510 B2
(45) Date of Patent: Oct. 20, 2026

(54) INFORMATION NOTIFICATION SYSTEM, MANAGEMENT DEVICE, EDGE DEVICE, INFORMATION NOTIFICATION METHOD, METHOD FOR OPERATING MANAGEMENT DEVICE, AND NON-TRANSITORY TANGIBLE STORAGE MEDIUM

(71) Applicant: DENSO CORPORATION, Kariya-city (JP)

(72) Inventor: Masatoshi Komiyama, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 301 days.

(21) Appl. No.: 17/990,780

(22) Filed: Nov. 21, 2022

(65) Prior Publication Data

US 2023/0206759 A1 Jun. 29, 2023

(30) Foreign Application Priority Data

Dec. 24, 2021 (JP) ................................ 2021-210839

(51) Int. Cl.
*G05D 1/00* (2024.01)
*G06V 20/58* (2022.01)
(Continued)

(52) U.S. Cl.
CPC ....... *G08G 1/096725* (2013.01); *G06V 20/58* (2022.01); *G07C 5/008* (2013.01); *G07C 5/0825* (2013.01); *H04N 7/183* (2013.01)

(58) Field of Classification Search
CPC ................................................ G08G 1/096725
See application file for complete search history.

(56) References Cited

U.S. PATENT DOCUMENTS 9,258,580 B1 * 2/2016 Otero ............... H04N 21/21815
10,104,605 B1 10/2018 Parshin et al.
(Continued)

FOREIGN PATENT DOCUMENTS

JP 2010-200123 A 9/2010
JP 2013-142978 A 7/2013
(Continued)

*Primary Examiner* — Ramon A. Mercado
*Assistant Examiner* — Paul W Arellano
(74) *Attorney, Agent, or Firm* — Harness, Dickey & Pierce, P.L.C.

(57) ABSTRACT

An information notification system includes a management device having a first management unit and a second management unit; and an edge device mounted on a vehicle. The edge device includes a data providing unit configured to collect vehicle data including position information of an edge-equipped vehicle, together with a state of the edge-equipped vehicle, and provide the vehicle data to the first management unit; and an event transmission unit configured to detect occurrence of a preset event and transmit an event notification including identification information for identifying the edge-equipped vehicle and type information indicating a type of the event to the second management unit. The first management unit includes a storage unit. The second management unit includes a data collection unit, a receiving unit, a geofence setting unit, a notification destination selection unit, and a notification unit.

18 Claims, 18 Drawing Sheets

(51) Int. Cl.

| | |
|---|---|
| ***G07C 5/00*** | (2006.01) |
| ***G07C 5/08*** | (2006.01) |
| ***G08G 1/0967*** | (2006.01) |
| *H04N 7/18* | (2006.01) |

(56) References Cited

U.S. PATENT DOCUMENTS

| | | | | |
|---|---|---|---|---|
| 10,671,876 | B1* | 6/2020 | Smith | G06V 20/63 |
| 2008/0183485 | A1* | 7/2008 | Drabble | H04W 4/021 705/1.1 |
| 2015/0127730 | A1* | 5/2015 | Aviv | H04L 51/58 709/204 |
| 2017/0162052 | A1 | 6/2017 | Sogabe | |
| 2020/0027333 | A1* | 1/2020 | Xu | G08G 1/164 |
| 2020/0137351 | A1* | 4/2020 | Bai | H04N 7/12 |
| 2020/0168080 | A1* | 5/2020 | Kim | G08G 1/164 |
| 2020/0195982 | A1* | 6/2020 | Streater | H04N 21/2187 |
| 2020/0231147 | A1 | 7/2020 | Hori et al. | |
| 2020/0252744 | A1 | 8/2020 | Kaneichi et al. | |
| 2020/0294401 | A1* | 9/2020 | Kerecsen | G08G 1/205 |
| 2021/0101592 | A1* | 4/2021 | Kokes | B60W 40/04 |
| 2021/0109518 | A1* | 4/2021 | Nozaki | G05D 1/0022 |
| 2021/0287543 | A1* | 9/2021 | Karapantelakis | G08G 1/205 |
| 2022/0038847 | A1 | 2/2022 | Kaneichi et al. | |
| 2023/0351823 | A1 | 11/2023 | Hori et al. | |

FOREIGN PATENT DOCUMENTS

| | | | |
|---|---|---|---|
| JP | 2020-521345 | A | 7/2020 |
| JP | 2021-064185 | A | 4/2021 |
| JP | 2021-113641 | A | 8/2021 |

* cited by examiner

DATA FORMAT

| UNIQUE LABEL | ECU | DATA | | | |
|---|---|---|---|---|---|
| | | TYPE | SIZE | VALUE | UNIT |
| ETHA | ENG | float | 4byte | 25.0 | °C |
| NE1 | ENG | float | 4byte | 3000 | rpm |
| ... | | | | | |

FIG. 11

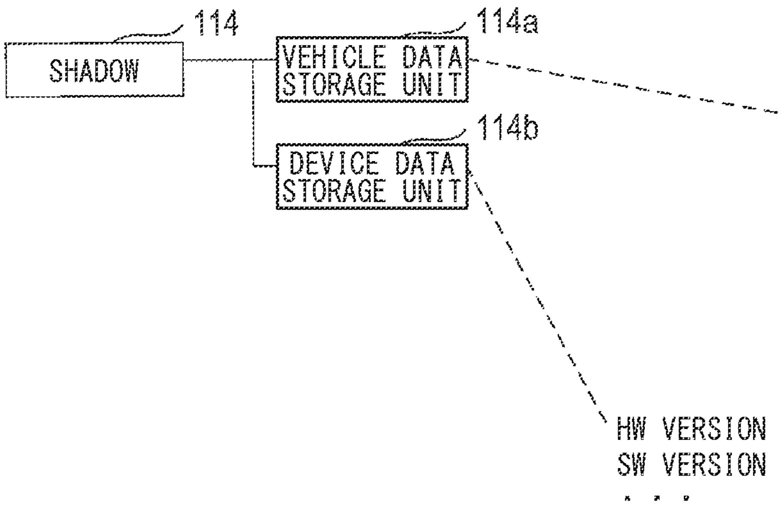

| PHYSICAL NAME | ITEM NAME | DATA TYPE |
|---|---|---|
| object-id | OBJECT ID | CHARACTER STRING |
| Shadow_version | SHADOW VERSION | NUMERICAL VALUE |
| mobility-data | DATA DEFINITION | CHARACTER STRING |

| PHYSICAL NAME | ITEM NAME | DATA TYPE |
|---|---|---|
| object-id | OBJECT ID | CHARACTER STRING |
| update_time | UPDATE TIME | NUMERICAL VALUE |
| version | VERSION | CHARACTER STRING |
| power_status | SYSTEM STATUS | CHARACTER STRING |
| power_status_timestamp | SYSTEM STATUS NOTIFICATION TIME STAMP | NUMERICAL VALUE |
| notify_reason | RESULT REASON | CHARACTER STRING |

FIG. 12

118

| ITEM NAME | DATA OVERVIEW |
|---|---|
| gateway-id | GATEWAY ID |
| object-id | OBJECT ID |
| shadow-version | SHADOW VERSION |
| vin | VEHICLE ID |
| location-lon | VEHICLE LATITUDE |
| location-lat | VEHICLE LONGITUDE |
| location-alt | VEHICLE ALTITUDE |

FIG. 13

126

| FIELD NAME | ITEM NAME | FORMAT |
|---|---|---|
| timestamp | TIME | long |
| schedule-type | SCHEDULE TYPE | keyword |
| gateway-id | GATEWAY ID | keyword |
| object-id | OBJECT ID | keyword |
| shadow-version | TIME (GW) | long |
| vin | VEHICLE ID | keyword |
| location | LOCATION | geo_point |
| alt | ALTITUDE | float |

INFORMATION NOTIFICATION SYSTEM, MANAGEMENT DEVICE, EDGE DEVICE, INFORMATION NOTIFICATION METHOD, METHOD FOR OPERATING MANAGEMENT DEVICE, AND NON-TRANSITORY TANGIBLE STORAGE MEDIUM

CROSS REFERENCE TO RELATED APPLICATION

The present application claims the benefit of priority from Japanese Patent Application No. 2021-210839 filed on Dec. 24, 2021. The entire disclosure of the above application is incorporated herein by reference.

TECHNICAL FIELD

The present disclosure relates to a technology for effectively using resources of a connected car.

BACKGROUND ART

A technology for connecting a vehicle to a cloud server or the like on a network and uploading and downloading various types of data between the vehicle and the cloud has been well-known.

SUMMARY

One aspect of the present disclosure provides an information notification system comprising a management device and an edge device. The management device includes a first management unit and a second management unit. The edge device is mounted on a vehicle.

The edge device includes a data providing unit and an event transmission unit. The data providing unit is configured to collect vehicle data including position information of an edge-equipped vehicle, which is a vehicle equipped with the edge device, together with a state of the edge-equipped vehicle, and provide the vehicle data to the first management unit. The event transmission unit is configured to detect occurrence of a preset event and transmit an event notification including identification information for identifying the edge-equipped vehicle and type information indicating a type of the event to the second management unit.

The first management unit includes a storage unit is configured to store the vehicle data repeatedly acquired from the edge device for each edge-equipped vehicle.

The second management unit includes a data collection unit, a receiving unit, a geofence setting unit, a notification destination selection unit, and a notification unit. The data collection unit is configured to collect the vehicle data stored in the storage unit from the first management unit. The receiving unit is configured to receive the event notification transmitted from the edge device of a registered vehicle that is the edge-equipped vehicle that has been registered. When the event notification is received, the geofence setting unit is configured to identify a position of a target vehicle, which is the registered vehicle to which the event has occurred, according to the identification information indicated in the event notification and the vehicle data collected by the data collection unit. The geofence setting unit is configured to set a geofence including the position of the target vehicle. The notification destination selection unit is configured to select notification destinations of information related to the event using the geofence set by the geofence setting unit and the vehicle data collected by the data collection unit. The notification unit is configured to transmit an alert notification for calling attention according to the type information indicated in the event notification to each of the notification destinations selected by the notification destination selection unit.

BRIEF DESCRIPTION OF DRAWINGS

FIG. 11 is a diagram showing a configuration of a shadow.

FIG. 12 is a diagram showing a configuration of a latest index.

FIG. 13 is a diagram showing a configuration of an index.

DESCRIPTION OF EMBODIMENTS

Figure 1:
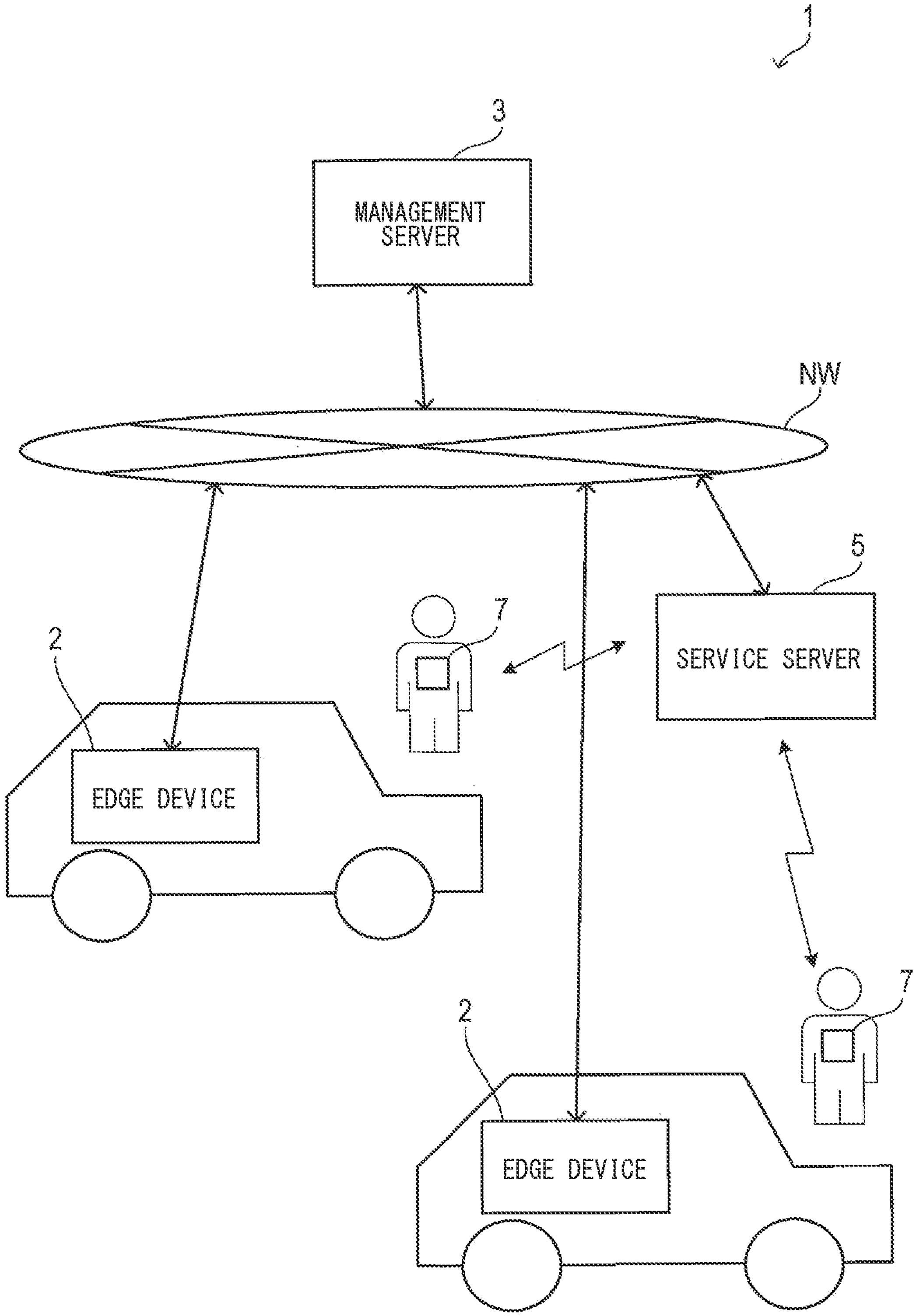
FIG. 1 is a block diagram showing a configuration of a mobility IoT system.

To begin with, a relevant technology will described first only for understanding the following embodiment. Technologies used for fleet services and the like are well-known. Fleet services are services that use a connected technology for commercial vehicles to provide services such as vehicle tracking, business management, driver management, regulatory compliance, and cost reduction.

As one example of fleet services, a service that activates a sensor that monitors the surroundings of a delivery vehicle to detect suspicious persons when a delivery person leaves the delivery vehicle during delivery is conceivable. In this case, when a suspicious person is detected, an image is captured and uploaded to a cloud server, or a notification is sent to a mobile device such as a smartphone carried by the delivery person.

However, such services have only been provided on a vehicle-by-vehicle basis.

One aspect of the present disclosure provides a technology that allows coping with events occurring to individual vehicles to be handled in cooperation with others in the vicinity.

An information notification system, comprises: a management device including a first management unit and a second management unit; and a plurality of edge devices mounted in vehicles. Each of the edge devices includes: a data providing unit configured to (i) collect vehicle data including position information of an edge-equipped vehicle, which is a vehicle equipped with the edge device, and a state of the edge-equipped vehicle, and (ii) provide the vehicle data to the first management unit; and an event transmission unit configured to detect occurrence of a preset event and transmit, to the second management unit, an event notification including identification information for identifying the edge-equipped vehicle and type information indicating a type of the event. The first management unit includes a storage unit configured to store the vehicle data repeatedly acquired from each of the edge devices. The second management unit includes (a) a data collection unit configured to collect the vehicle data stored in the storage unit from the first management unit; (b) a receiving unit configured to receive the event notification transmitted from each of the edge devices of registered vehicles, which are one or more of the edge-equipped vehicles and have been registered; (c) a geofence setting unit configured to identify a position of a target vehicle, which is one of the registered vehicles to which the event has occurred, according to the identification information indicated in the event notification and the vehicle data collected by the data collection unit, when the event notification is received, and set a geofence to include the position of the target vehicle; (d) a notification destination selection unit configured to select, among the registered vehicles, notification destinations of information in association with the event using the geofence set by the geofence setting unit and the vehicle data collected by the data collection unit; and (e) a notification unit configured to transmit, to each of the notification destinations selected by the notification destination selection unit, an alert notification for calling attention according to the type information indicated in the event notification.

One aspect of the present disclosure is a management device consisting the information notification system described above. The management device comprises a first management unit and a second management unit. The management device constitutes an information notification system together with a plurality of edge devices mounted in vehicles. Each of the edge devices is configured to (i) collect vehicle data including position information of an edge-equipped vehicle, which is a vehicle equipped with the edge device, and a state of the edge-equipped vehicle; (ii) provide the vehicle data to the first management unit; (iii) detect occurrence of a preset event; and (iv) transmit, to the second management unit, an event notification including identification information for identifying the edge-equipped vehicle and type information indicating a type of the event. The first management unit includes a storage unit configured to store the vehicle data repeatedly acquired from each of the edge devices. The second management unit includes (a) a data collection unit configured to collect the vehicle data stored in the storage unit from the first management unit; (b) a receiving unit configured to receive the event notification transmitted from the edge devices of registered vehicles that are one or more of the edge-equipped vehicles and have been registered; (c) a geofence setting unit configured to, when the event notification is received, identify a position of a target vehicle, which is one of the registered vehicles to which the event has occurred, according to the identification information indicated in the event notification and the vehicle data collected by the data collection unit; and set a geofence to include the position of the target vehicle; (d) a notification destination selection unit configured to select, among the registered vehicles, notification destinations of information in association with the event using the geofence set by the geofence setting unit and the vehicle data collected by the data collection unit; and (e) a notification unit configured to transmit an alert notification for calling attention according to the type information indicated in the event notification to each of the notification destinations selected by the notification destination selection unit.

Another aspect of the present disclosure is an edge device consisting the information notification system described above. The edge device is mounted in a subject vehicle. The edge device constitutes an information notification system together with a management device including a first management unit and a second management unit. The first management unit is configured to store vehicle data repeatedly acquired from the edge device and other edge devices of edge-equipped vehicles that are vehicles equipped with the other edge devices. The second management unit is configured to: collect the vehicle data from the first management unit, when an event notification transmitted from the edge devices of registered vehicles that are vehicles including the subject vehicle and one or more of the edge-equipped vehicles and have been registered is received; identify a position of a target vehicle, which is one of the registered vehicles to which an event has occurred, according to identification information indicated in the event notification and the vehicle data; set a geofence to include the position of the target vehicle; select, among the registered vehicles, notification destinations of information in association with the event using the geofence and the vehicle data; and transmit, to each of the selected notification destinations, an alert notification for calling attention according to type information indicated in the event notification. The edge device comprises a data providing unit configured to: collect the vehicle data including position information of the subject vehicle and a state of the edge-equipped vehicle; and provide the vehicle data to the first management unit. An event transmission unit configured to detect occurrence of the event; and transmit, to the second management unit, the event notification including the identification information for identifying the subject vehicle and the type information indicating a type of the event.

Yet another aspect of the present disclosure is an information notification method in the information notification system described above. The information notification method performed by an information notification system includes a management device and a plurality of edge devices mounted in vehicles. The management device includes a first management unit and a second management unit. The information notification method includes steps of, by each of the edge devices, (a) collecting vehicle data including position information of an edge-equipped vehicle, which is a vehicle equipped with the edge device, and a state of the edge-equipped vehicle; (b) providing the vehicle data to the first management unit; and (c) detecting occurrence of a preset event and transmitting, to the second management unit, an event notification including identification information for identifying the edge-equipped vehicle and type information indicating a type of the event; (d) by the first management unit, storing the vehicle data repeatedly acquired from the edge devices; and by the second management unit, (e) collecting the vehicle data from the first management unit; (f) receiving the event notification transmitted from each of the edge devices of registered vehicles that are one or more of the edge-equipped vehicles and have been registered; (g) when the event notification is received, identifying a position of a target vehicle, which is one of the registered vehicles to which the event has occurred, according to the identification information indicated in the event notification and the vehicle data collected by the first management unit and setting a geofence to include the position of the target vehicle; (h) selecting, among the registered vehicles, notification destinations of information in association with the event using the geofence and the vehicle data collected by the first management unit; and (i) transmitting, to each of the selected notification destinations, an alert notification for calling attention according to the type information indicated in the event notification.

Yet another aspect of the present disclosure is a method of operating a management device consisting the information notification system described above. The management device includes a first management unit and a second management unit and constitutes an information notification system together with a plurality of edge devices mounted in vehicles. Each of the edge devices is configured to: collect vehicle data including position information of an edge-equipped vehicle, which is a vehicle equipped with the edge device, and a state of the edge-equipped vehicle; provide the vehicle data to the first management unit; detect occurrence of a preset event; and transmit, to the second management unit, an event notification including identification information for identifying the edge-equipped vehicle and type information indicating a type of the event. The method comprises: (a) by the first management unit, storing the vehicle data repeatedly acquired from the edge devices; and by the second management unit, (b) acquiring the vehicle data from the first management unit; (c) receiving the event notification transmitted from the edge devices of registered vehicles that are one or more of the edge-equipped vehicle and have been registered; (d) when the event notification is received, identifying a position of a target vehicle, which is one of the registered vehicles to which the event has occurred, according to the identification information indicated in the event notification and the vehicle data acquired from the first management unit, and setting a geofence to include the position of the target vehicle; (e) selecting, among the registered vehicles, notification destinations of information in association with the event using the geofence and the vehicle data acquired from the first management unit, and (f) transmitting, to each of the selected notification destinations, an alert notification for calling attention according to the type information indicated in the event notification.

Yet another aspect of the present disclosure is, in an edge device consisting the information notification system described above, a non-transitory tangible storage medium storing a program causing a computer consisting the edge device to function as each unit of the edge device. The edge device is mounted in a subject vehicle and consists an information notification system together with a management device including a first management unit and a second management unit. The first management unit is configured to store vehicle data repeatedly acquired from the edge device and other edge devices for edge-equipped vehicles that are vehicles equipped with the edge devices. The second management unit is configured to: collect the vehicle data from the first management unit, when an event notification transmitted from the edge devices of registered vehicles that are the subject vehicle and one of more of the edge-equipped vehicles and have been registered is received; identify a position of a target vehicle, which is one of the registered vehicles in which an event has occurred, according to identification information indicated in the event notification and the vehicle data collected by the first management unit; set a geofence to include the position of the target vehicle; select, among the registered vehicles, notification destinations of information in association with the event using the geofence and the vehicle data collected by the first management unit; and transmit, to each of the selected notification destinations, an alert notification for calling attention according to type information indicated in the event notification. The program, when executed by a computer of the edge device, causes the computer to: (a) collect the vehicle data including position information of the subject vehicle and a state of the subject vehicle; (b) provide the vehicle data to the first management unit; (c) detect occurrence of the event; and (d) transmit, to the second management unit, the event notification including the identification information for identifying the subject vehicle and the type information indicating a type of the event.

According to the above-described aspects, since the occurrence of the event is promptly notified to the notification destination selected using the geofence, the people of the notification destination can cope with the event that has occurred to the target vehicle in cooperation with each other.

Next, embodiments of the present disclosure will be described below with reference to the drawings.

1. Overall Configuration

A mobility IoT system 1 shown in FIG. 1 includes multiple edge devices 2, a management server 3, a service server 5, and multiple driver terminals 7. IoT is an abbreviation for Internet of Things. The management server 3 and the service server 5 may be configured as cloud servers.

The edge device 2 is mounted on a vehicle. Hereinafter, a vehicle equipped with the edge device 2 is referred to as an edge-equipped vehicle. The edge device 2 collects vehicle data of edge-equipped vehicles and uploads the collected vehicle data to the management server 3. The edge device 2 performs vehicle control according to instructions from the management server 3. The edge device 2 executes various randomly installed application programs.

The management server 3 performs communication with the edge device 2 and the service server 5 via a wide area communication network NW. The management server 3 accumulates vehicle data uploaded from the edge device 2 in a database. The management server 3 provides the service server 5 with an interface for accessing the database of the management server 3 and edge-equipped vehicles.

The service server 5 uses an interface provided by the management server 3 to perform vehicle data collection and vehicle control for the registered edge-equipped vehicle, thereby providing various services to a driver of the edge-equipped vehicle.

The driver terminal 7 is a mobile terminal such as a smartphone and a tablet possessed by the driver of the edge-equipped vehicle. The driver terminal 7 performs communication with the service server 5. The driver terminal 7 executes various randomly installed application programs, similarly to the edge device 2.

In the present embodiment, the service server 5 provides a suspicious person information provision service and a hit-and-run information provision service for edge-equipped vehicles used by home delivery companies for home delivery services and drivers of the edge-equipped vehicles.

Although the service server 5 is provided separately from the management server 3 in the present embodiment, it may also be provided integrally with the management server 3. The mobility IoT system 1 may include multiple service servers 5 that provide different service contents.

2. Edge Device

[2-1. Hardware Configuration]

Figure 2:
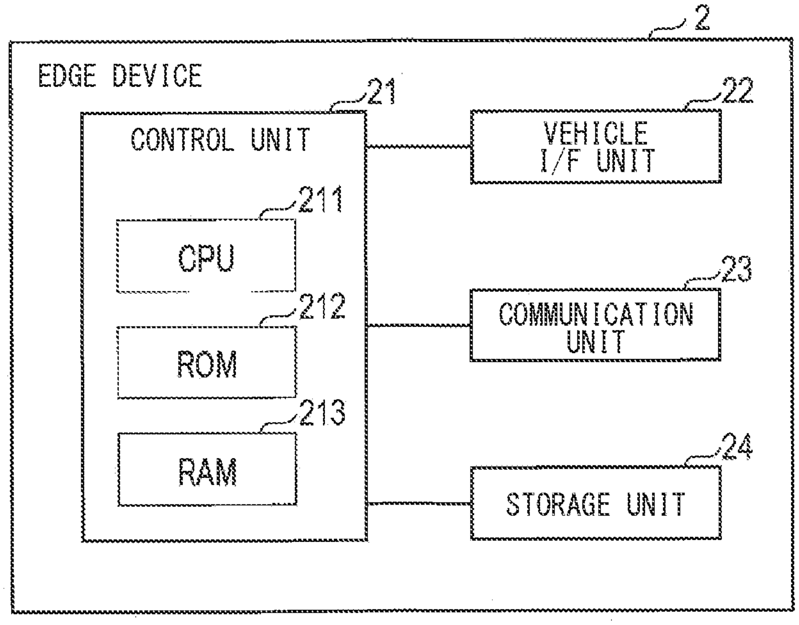
FIG. 2 is a block diagram showing a configuration of an edge device.

As shown in FIG. 2, the edge device 2 includes a control unit 21, a vehicle interface (hereinafter referred to as a vehicle I/F) unit 22, a communication unit 23, and a storage unit 24.

The control unit 21 includes a CPU 211, a ROM 212, and a RAM 213. Various functions of the control unit 21 are implemented by the CPU 211 executing a program stored in a non-transitory tangible storage medium. In this example, the ROM 212 corresponds to a non-transitory tangible storage medium storing programs. A method corresponding to the program is performed by executing the program.

The vehicle I/F unit 22 is connected to various in-vehicle devices via an in-vehicle network or the like of the edge-equipped vehicle, and acquires various types of information from the in-vehicle devices. In-vehicle networks may include CAN and Ethernet. CAN is an abbreviation for Controller Area Network. CAN is a registered trademark. Ethernet is a registered trademark. The in-vehicle device connected to the vehicle I/F unit 22 may include an exterior device that is installed later as well as a device that is originally mounted on the vehicle. Exterior devices may include sensors, cameras, audio devices, display devices, and the like.

The communication unit 23 performs data communication with the management server 3 and the service server 5 by wireless communication via the wide area communication network NW.

The storage unit 24 is a storage device in which vehicle data and the like acquired via the vehicle I/F unit 22 are stored. Vehicle data accumulated in the storage unit 24 is uploaded to the management server 3 via the communication unit 23.

[2-2. Functional Configuration]

Figure 3:
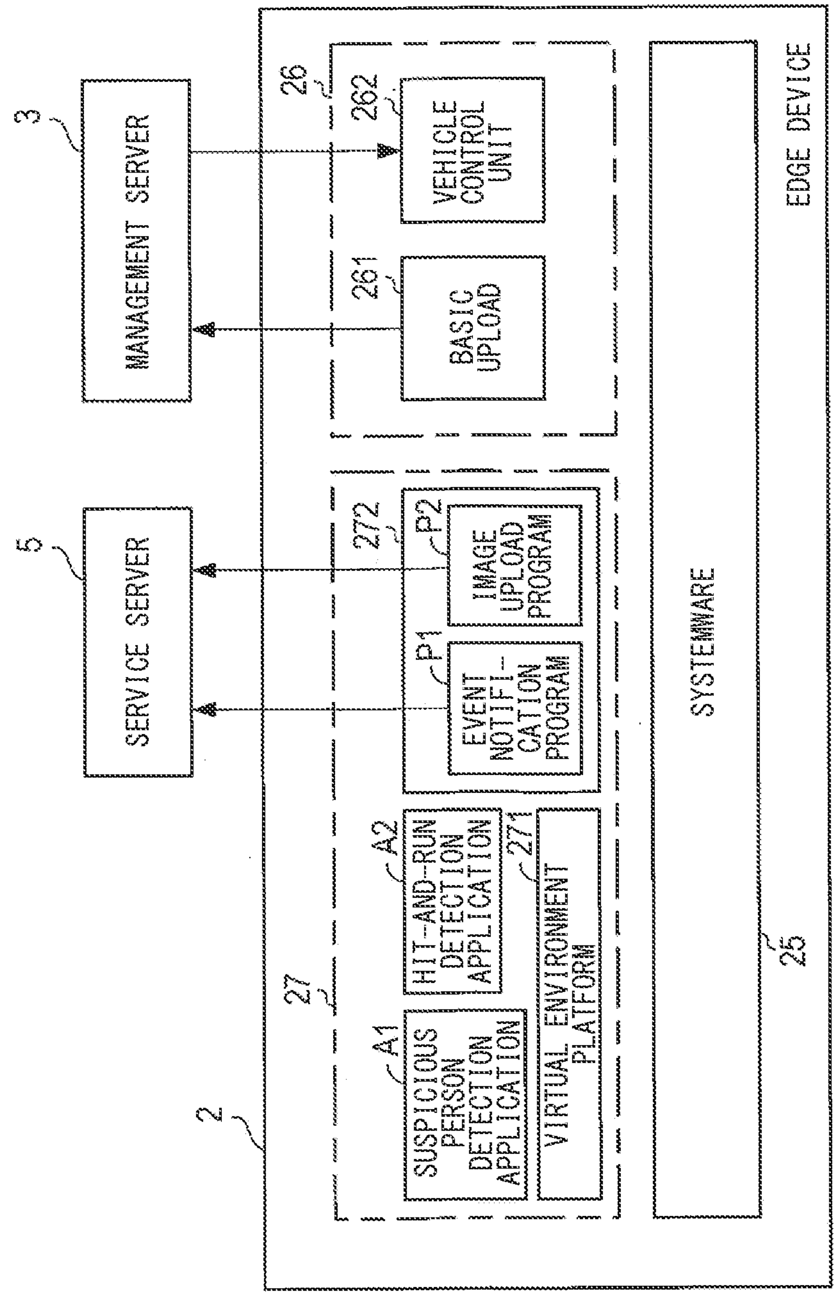
FIG. 3 is a functional block diagram showing a functional configuration of the edge device.

As shown in FIG. 3, the edge device 2 includes systemware 25, a core function execution unit 26, and an application execution unit 27 when shown in blocks by function. The functions of each of these units 25 to 27 are implemented by the CPU 211 executing programs stored in the ROM 212.

The systemware 25 abstracts hardware and includes basic software for providing various services necessary for executing application programs, and drivers for supporting special processing that cannot be standardized. The basic software includes an operating system (hereinafter referred to as an OS), a hardware abstraction layer (hereinafter referred to as a HAL), and the like. The hardware to be abstracted by the systemware 25 includes in-vehicle devices and exterior devices connected to the edge device 2 via the vehicle I/F unit 22 in addition to the hardware included in the edge device 2.

The core function execution unit 26 and the application execution unit 27 are implemented by software that operates on the systemware 25.

[2-2-1. Core Function Execution Unit]

The core function execution unit 26 provides a function as an edge computer that mediates between the management server 3 and an edge-equipped vehicle. Specifically, the core function execution unit 26 includes a basic upload unit 261 and a vehicle control unit 262. The basic upload unit 261 collects vehicle data of the edge-equipped vehicle and uploads the data to the management server 3. The vehicle control unit 262 controls the edge-equipped vehicle according to instructions from the management server 3. The vehicle control unit 262 may perform, for example, control to sound the horn in a designated pattern, control to flash a designated lighting device in a designated pattern, control to limit the upper limit of a moving speed, and the like.

Vehicle data provided to the management server 3 by the basic upload unit 261 will be described.

The basic upload unit 261 repeatedly collects vehicle data from the edge-equipped vehicle via the vehicle I/F unit 22. The basic upload unit 261 converts the collected vehicle data into a standard format and stores it in the storage unit 24 in association with the hierarchical classification. Hereinafter, the hierarchized vehicle data will be referred to as standardized vehicle data.

Figure 4:
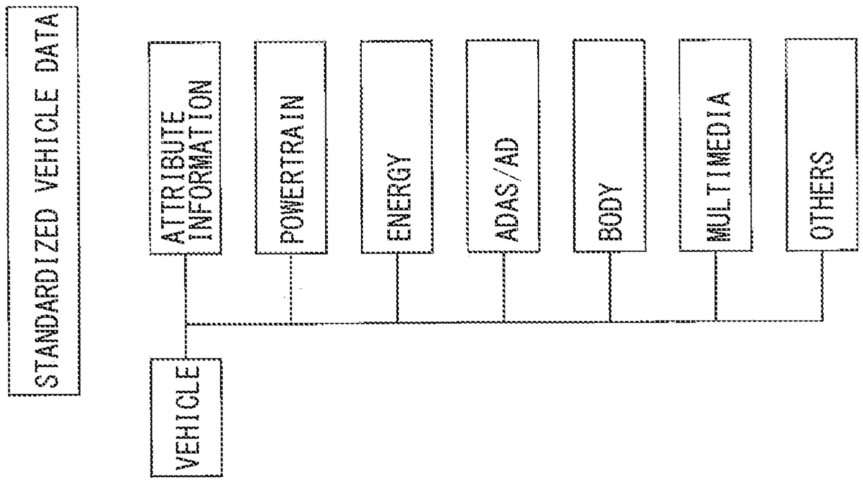
FIG. 4 is a diagram showing a first hierarchy of standardized vehicle data and a data format.

As shown in FIG. 4, the standard format of the vehicle data may include items such as “unique label”, “ECU”, “data type”, “data size”, “data value”, and “data unit”.

A “unique label” is information for identifying each physical quantity. For example, “ETHA” indicates an intake air temperature, and “NE1” indicates an engine speed.

“ECU” is information indicating an electronic control unit (hereinafter referred to as ECU) from which vehicle data is generated. For example, “ENG” indicates that the data is generated by the engine ECU.

A “data type” is information for defining properties of a “data value”. A “data type” may include, for example, integer types, floating point types, logical types, character types, and the like.

A “data size” is information indicating how many bytes the “data value” is expressed.

A “data value” is information indicating the value of the physical quantity specified by the “unique label”.

A “data unit” is information indicating the unit of the data value.

The “data value” is normalized so that the same physical quantity is expressed in the same unit regardless of the vehicle type and vehicle manufacturer.

The “unique label” may include information for identifying “processed data” in addition to identifying “unprocessed data” obtained from the vehicle. “Processed data” refers to data converted into a format that is easier for users to understand by performing a predetermined calculation on one or more pieces of “unprocessed data”.

Standardized vehicle data has multiple hierarchical structures. For example, as shown in FIG. 4, the standardized vehicle data includes “attribute information”, “powertrain”, “energy”, “ADAS/AD”, “body”, “multimedia”, and “others” as items set in a first hierarchy, which is the highest level. ADAS is an abbreviation for Advanced Driver Assistance System. AD is an abbreviation for Autonomous Driving. Each item belonging to the first hierarchy represents a category of vehicle data.

Figure 5:
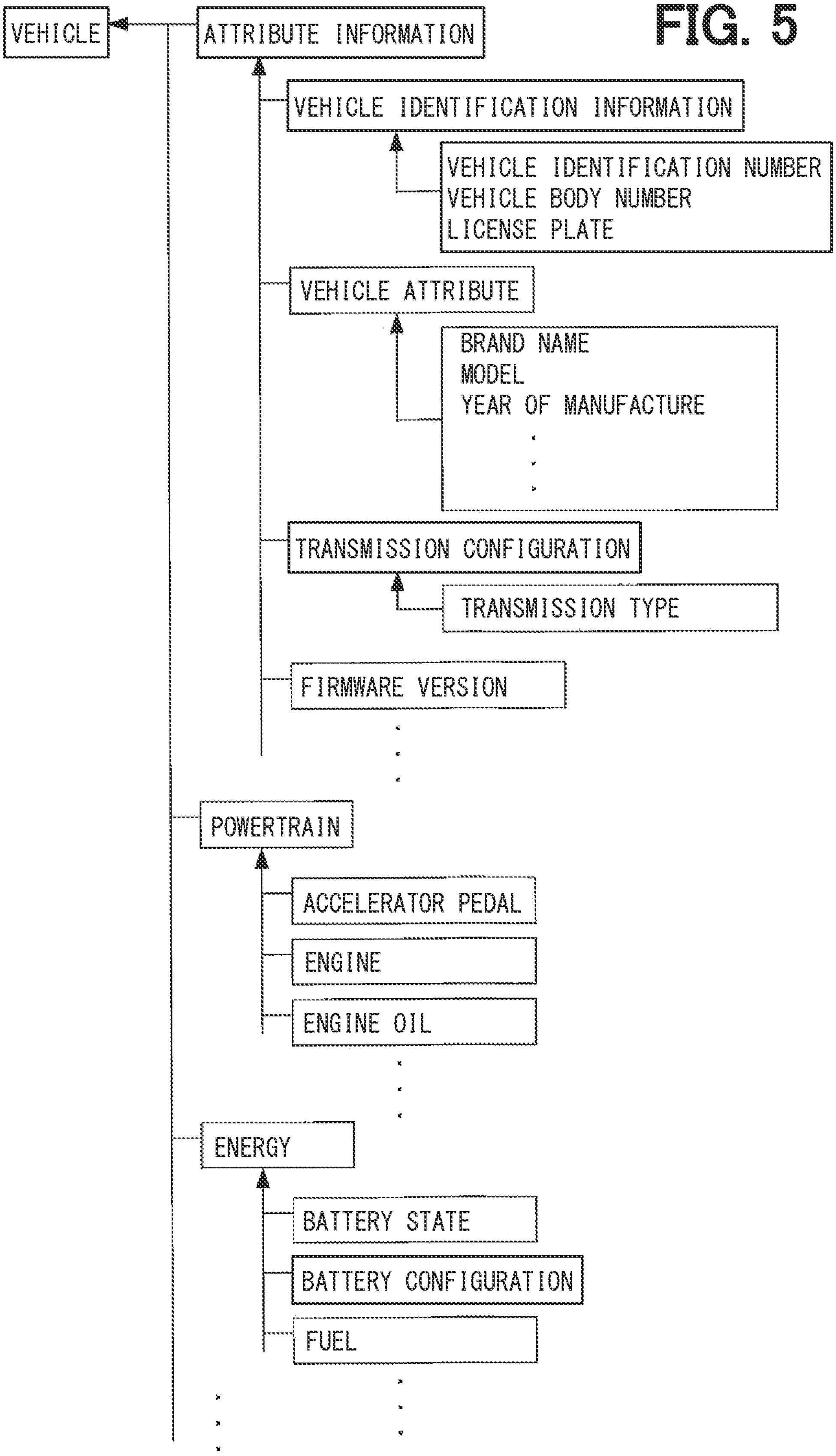
FIG. 5 is a diagram showing a configuration of standardized vehicle data.

As shown in FIG. 5, the standardized vehicle data may have a second hierarchy and a third hierarchy in addition to the first hierarchy. The second hierarchy is the hierarchy immediately below the first hierarchy, and the third hierarchy is the hierarchy directly below the second hierarchy.

For example, the item “attribute information” in the first hierarchy includes “vehicle identification information”, “vehicle attribute”, “transmission configuration”, “firmware version”, and the like as items in the second hierarchy. The item "powertrain" in the first hierarchy includes "accelerator pedal", "engine", "engine oil", and the like as items in the second hierarchy. The item "energy" in the first hierarchy includes "battery state", "battery configuration", "fuel", and the like as items in the second hierarchy. The respective items belonging to the second hierarchy represent a category of vehicle data.

For example, the item "vehicle identification information" in the second hierarchy includes "vehicle identification number", "vehicle body number", "license plate", and the like as items in the third hierarchy. The item "vehicle attribute" in the second hierarchy includes "brand name", "model", "year of manufacture", and the like as items in the third hierarchy. The item "transmission configuration" in the second hierarchy includes "transmission type" as an item in the third hierarchy. Although illustration is omitted, the item "accelerator pedal" in the second hierarchy includes "state of accelerator pedal", "opening degree of accelerator pedal", and the like as items in the third hierarchy. The item "engine" in the second hierarchy includes "state of engine", "rotational speed", and the like as items in the third hierarchy. The respective items in the third hierarchy correspond to a "unique label" in the standard format. That is, each piece of vehicle data is stored in association with each item in the third hierarchy. Each piece of vehicle data belonging to the standardized vehicle data is also called an item.

Thus, each item in the first hierarchy includes one or more items in the second hierarchy, and each item in the second hierarchy includes one or more items in the third hierarchy, that is, vehicle data.

For example, vehicle data whose "unique label" is "vehicle identification information" is stored in a storage area in which the first hierarchy is "attribute information", the second hierarchy is "vehicle identification information", and the third hierarchy is "vehicle identification number" in the standardized vehicle data.

The item "others" in the first hierarchy may include, for example, position information acquired from a GPS device mounted on the vehicle via the vehicle I/F unit 22, that is, latitude, longitude, and altitude.

A procedure for uploading vehicle data to the management server 3 by the basic upload unit 261 will be described.

A transmission cycle for transmitting data to the management server 3 is set for each piece of vehicle data belonging to the standardized vehicle data. The transmission cycle is set to be shorter for data that changes more frequently or for data that has a higher degree of importance, depending on the degree of change in the data, the degree of importance of the data, and the like. That is, each piece of vehicle data is transmitted at a frequency according to its characteristics. The transmission cycle is, for example, a 500 ms cycle, a 2 s cycle, a 4 s cycle, a 30 s cycle, a 300 s cycle, a 12 hour cycle, or the like.

The transmission timing is set to, for example, a 250 ms cycle. Each piece of vehicle data is uploaded according to the schedule and at the determined transmission timing. The schedule is set to make transmission of a large amount of vehicle data not concentrate at the same transmission timing.

[2-2-2. Application Execution Unit]

Referring back to FIG. 3, the application execution unit 27 provides a function of executing application programs (hereinafter referred to as external applications) A1, A2, . . . , which are randomly installed later. The application execution unit 27 includes a virtual environment platform 271 and a library 272.

The virtual environment platform 271 has a function of simplifying the execution and management of containerized external applications Ai by virtualizing the OS of the systemware 25. The external application Ai is executed on the virtual environment platform 271. The external application Ai includes a suspicious person detection application A1 and a hit-and-run detection application A2.

The library 272 is a group of programs for providing standard functions commonly used by the external applications Ai. The library 272 includes an event notification program P1 and an image upload program P2. The event notification program P1 provides a function of transmitting event notifications to the service server 5 according to instructions from the external application Ai. The image upload program P2 provides a function of uploading images captured by an on-board camera to the service server 5 according to instructions from the external application Ai.

[2-3. Suspicious Person Detection Application]

The suspicious person detection application A1, which is one of the external applications executed by the application execution unit 27, will be described with reference to the flowcharts of FIGS. 6 and 7.

The suspicious person detection application A1 includes a detection process and an information provision process. The suspicious person detection application A1 is repeatedly executed when installed in the edge device 2.

Figure 6:
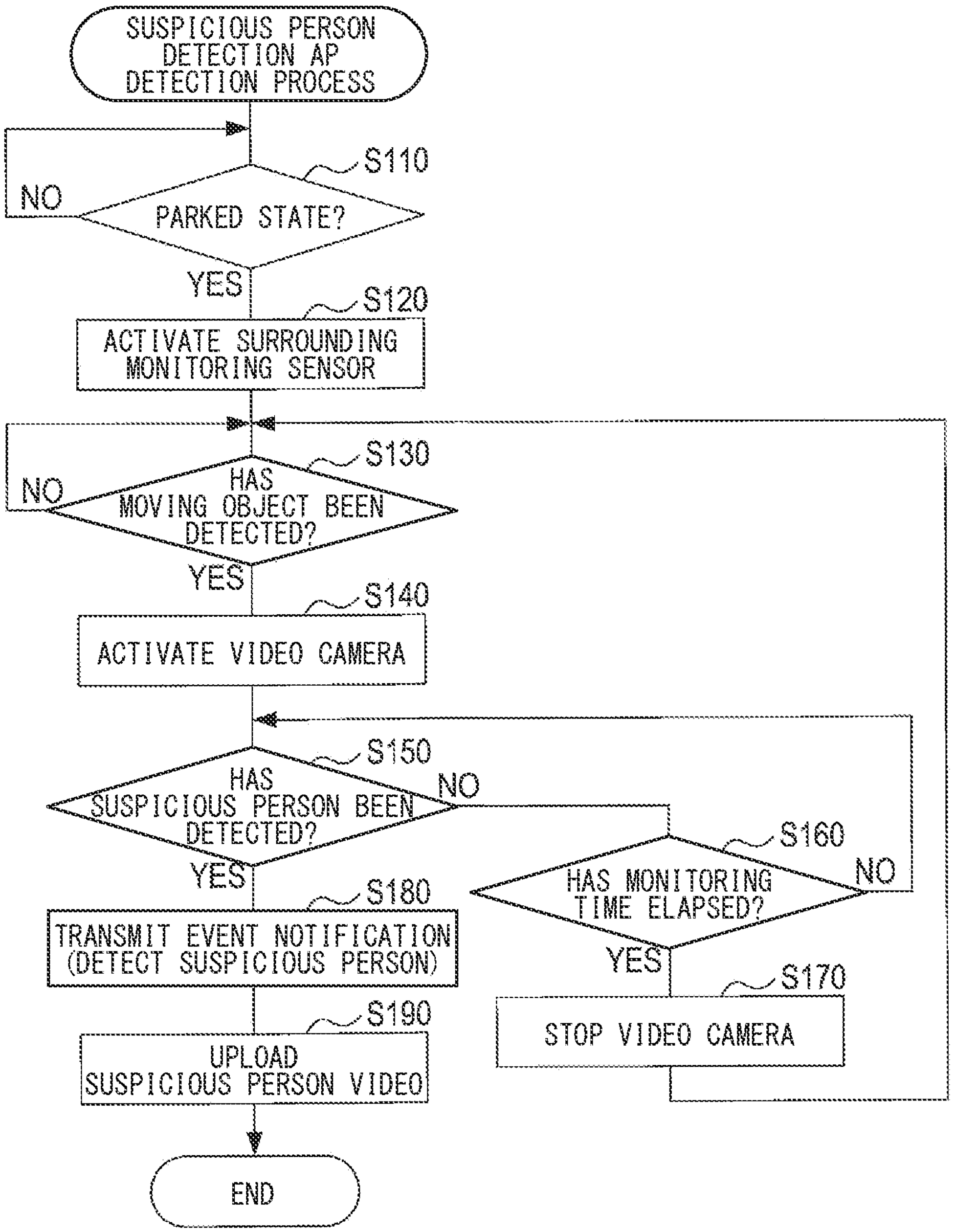
FIG. 6 is a flowchart showing a detection process of a suspicious person detection application.

As shown in FIG. 6, when the detection process is started, in S110, the CPU 211 determines whether or not the edge-equipped vehicle is in a parked state. When determining whether or not the edge-equipped vehicle is in the parked state, the edge-equipped vehicle may be determined to be in the parked state, for example, when a shift lever is in the parking position and a vehicle speed is zero. When the CPU 211 determines that the edge-equipped vehicle is in the parked state, the process proceeds to S120, and when the CPU determines that the edge-equipped vehicle is not in the parked state, the CPU waits by repeating the process of S110.

In S120, the CPU 211 activates a surrounding monitoring sensor provided in the edge-equipped vehicle via the vehicle I/F unit 22. The surrounding monitoring sensor can use, for example, a sonar, a lidar, or a radar that detects obstacles within a detection range of 3 m or less around the vehicle. The number of surrounding monitoring sensors may be one or plural.

In S130, the CPU 211 determines whether or not a moving object has been detected by the surrounding monitoring sensor. When the CPU 211 determines that a moving object has been detected, the process proceeds to S140, and when the CPU determines that a moving object has not been detected, the CPU waits by repeating the process of S130.

In S140, the CPU 211 activates a video camera for capturing an image of a suspicious person via the vehicle I/F unit 22 and starts capturing.

In subsequent S150, the CPU 211 determines whether or not a suspicious person has been detected from the image of the video camera. For example, when a moving object is determined to be a person from the image, and the moving object determined to be the person continues to exist within the monitoring range of the surrounding monitoring sensor for a certain period of time or more, the CPU 211 may determine that the person is a suspicious person. When the CPU 211 determines that a suspicious person has been detected, the process proceeds to S180, and when the CPU determines that a suspicious person has not been detected, the process proceeds to S160.

In S160, the CPU 211 determines whether or not a preset monitoring time has elapsed since the video camera was activated. When the CPU 211 determines that the monitoring time has elapsed, the process proceeds to S170, and when the CPU determines that the monitoring time has not elapsed, the process returns to S150.

In S170, the CPU 211 stops the video camera activated in S140 and returns the process to S130.

In S180, the CPU 211 transmits an event notification to the service server 5 via the communication unit 23. The event notification includes type information indicating that the content of the event is suspicious person detection, and transmission source information indicating a vehicle ID or the like for identifying the edge-equipped vehicle that is the transmission source of the event notification. Hereinafter, the event notification transmitted in S180 is also referred to as a suspicious person detection notification.

In subsequent S190, the CPU 211 uploads a suspicious person video, which is an image captured by a video camera for capturing images of a suspicious person and when a suspicious person is detected, to the service server 5 via the communication unit 23, and ends the process.

Figure 7:
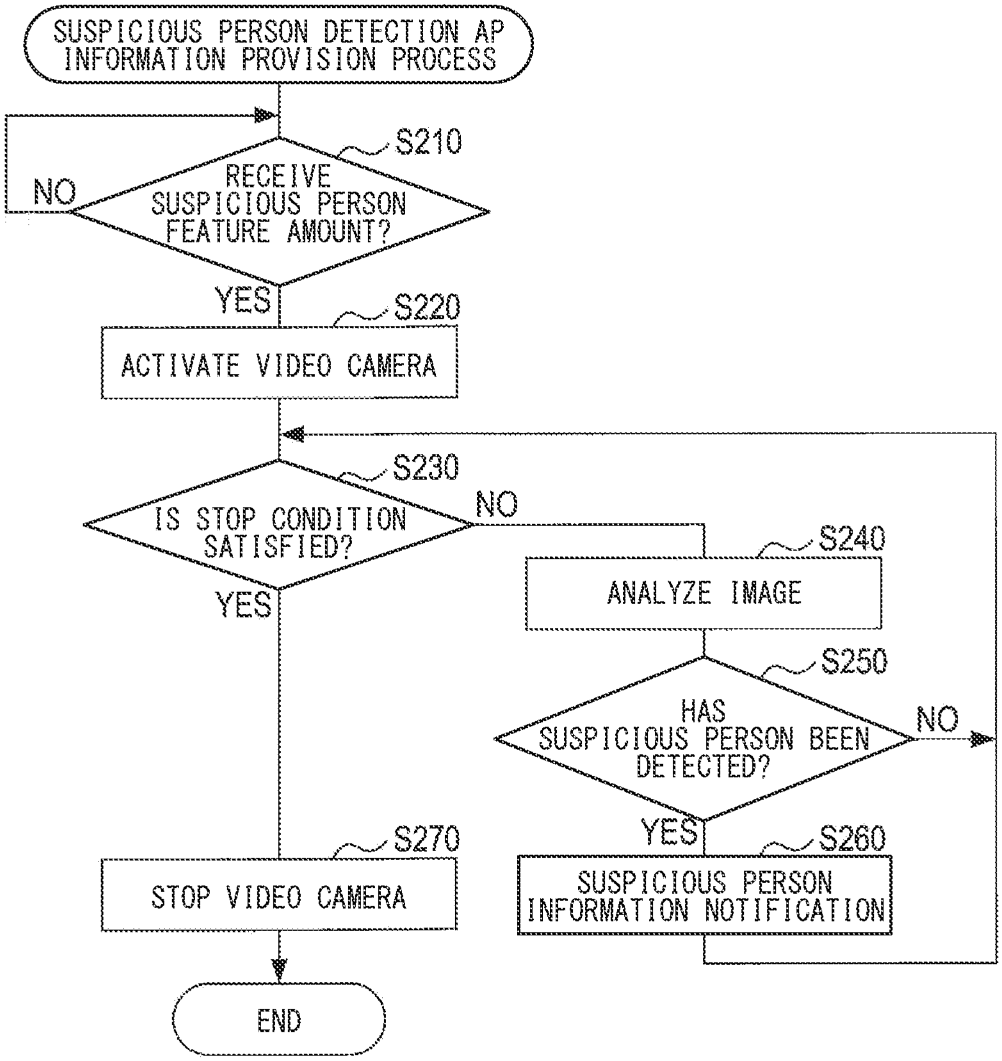
FIG. 7 is a flowchart showing an information provision process of the suspicious person detection application.

As shown in FIG. 7, when the detection process is started, in S210, the CPU 211 determines whether or not a suspicious person feature amount is received from the service server 5. When the CPU 211 determines that a suspicious person feature amount is received, the process proceeds to S220, and when the CPU determines that a suspicious person feature amount is not received, the CPU waits by repeating the process of S210.

In S220, the CPU 211 activates a video camera for capturing an image of the surroundings of the vehicle via the vehicle I/F unit 22 and starts capturing.

In subsequent S230, the CPU 211 determines whether or not the condition for stopping the video camera activated in the previous S220 is satisfied. As the condition for stopping the video camera, for example, reception of a stop instruction from the service server 5, elapse of a certain period of time, or the like can be used. When the CPU 211 determines that the stop condition is satisfied, the process proceeds to S270, and when the CPU determines that the stop condition is not satisfied, the process proceeds to S240.

In S240, the CPU 211 extracts the same type of feature amount as the suspicious person feature amount by analyzing the image obtained from the video camera.

In subsequent S250, the CPU 211 determines whether or not a suspicious person has been detected from the image of the video camera. Specifically, the CPU 211 determines whether or not a feature amount that matches the suspicious person feature amount received from the service server 5 is extracted from the image. When the CPU 211 determines that a suspicious person has been detected, the process proceeds to S260, and when the CPU determines that a suspicious person has not been detected, the process returns to S230.

In S260, the CPU 211 transmits a suspicious person finding notification indicating that a suspicious person has been detected to the service server 5, and returns the process to S230. The suspicious person finding notification includes information indicating the detected position and time. The suspicious person finding notification may be attached with an image in which the feature amount matching the suspicious person feature amount is detected.

In S270, the CPU 211 stops the video camera activated in the previous S220 and ends the process.

3. Management Server

[3-1. Hardware Configuration]

Figure 8:
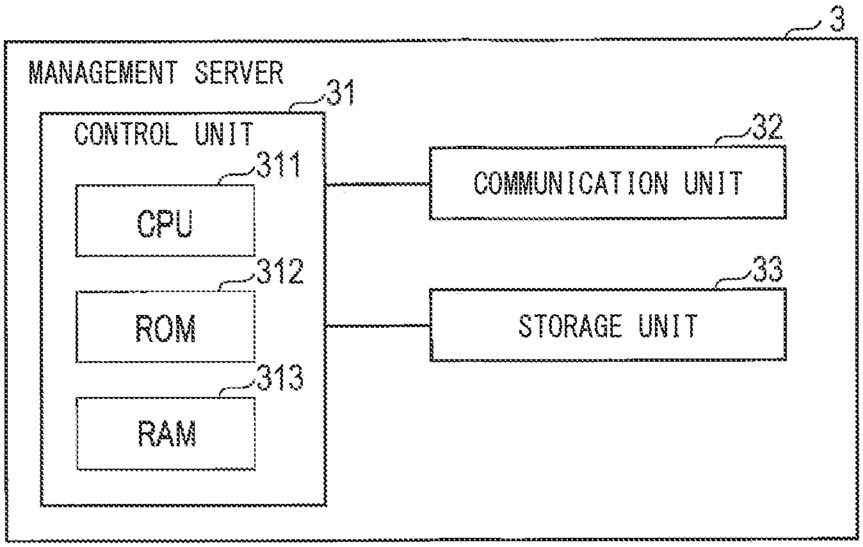
FIG. 8 is a block diagram showing a configuration of a management server.

As shown in FIG. 8, the management server 3 includes a control unit 31, a communication unit 32, and a storage unit 33.

The control unit 31 includes a CPU 311, a ROM 312, and a RAM 313. Various functions of the control unit 31 are implemented by the CPU 311 executing a program stored in a non-transitory tangible storage medium. In this example, the ROM 312 corresponds to a non-transitory tangible storage medium storing programs. A method corresponding to the program is performed by executing the program.

The communication unit 32 performs data communication with the multiple edge devices 2 and the service server 5 via a wide area communication network NW. For communication with the edge devices 2, for example, MQTT, which is a publish/subscribe type simple and lightweight protocol, may be used. MQTT is an abbreviation for Message Queue Telemetry Transport.

The storage unit 33 is a storage device for storing vehicle data and the like provided from the edge device 2.

[3-2. Functional Configuration]

Figure 9:
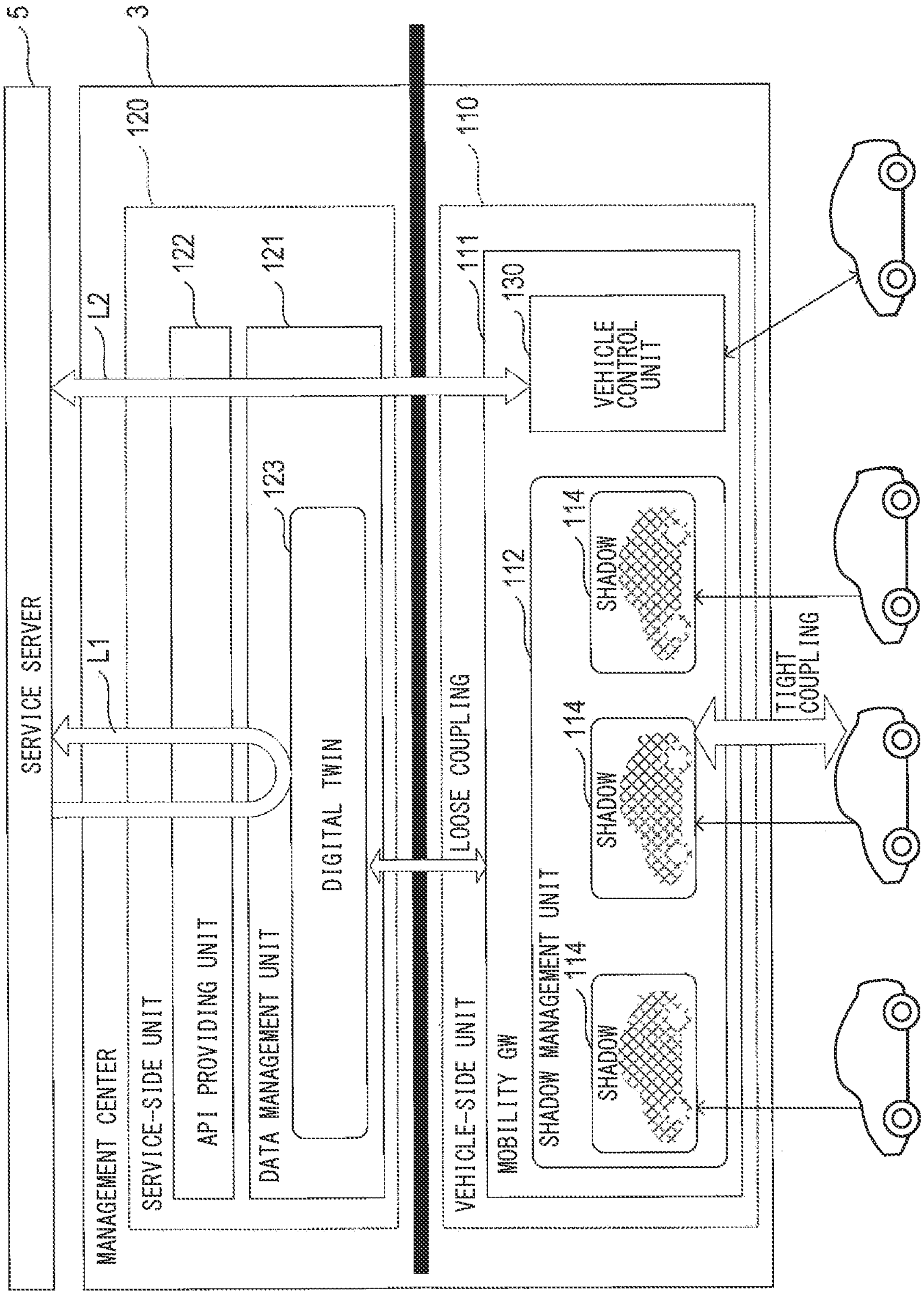
FIG. 9 is a functional block diagram showing a functional configuration of the management server.

As shown in FIG. 9, the management server 3 includes a vehicle-side unit 110 and a service-side unit 120 when shown in blocks by function.

The method of implementing these elements consisting the management server 3 is not limited to software, and some or all of the elements may be implemented using one or more pieces of hardware. For example, when the above functions are implemented by an electronic circuit that is hardware, the electronic circuit may be implemented by a digital circuit including many logic circuits, an analog circuit, or a combination thereof.

The vehicle-side unit 110 includes a mobility gateway (hereinafter referred to as a mobility GW) 111.

The mobility GW 111 includes a shadow management unit 112 and a vehicle control unit 130. The shadow management unit 112 has a function of managing shadows 114 provided for each vehicle equipped with the edge device 2. The shadow 114 is generated on the basis of the standardized vehicle data transmitted from the edge device 2. The vehicle control unit 130 has a function of controlling the vehicle equipped with the edge device 2 according to instructions from the service server 5.

The service-side unit 120 includes a data management unit 121 and an API providing unit 122. API is an abbreviation for Application Programming Interface.

The data management unit 121 has a function of managing a digital twin 123, which is a virtual space for providing vehicle access independent of changes in vehicle connection state. The digital twin 123 is one of databases constructed on the storage unit 33.

The API providing unit 122 is a standard interface for the service server 5 to access the mobility GW 111 and the data management unit 121.

[3-2-1. Data Accumulation Function]

Figure 10:
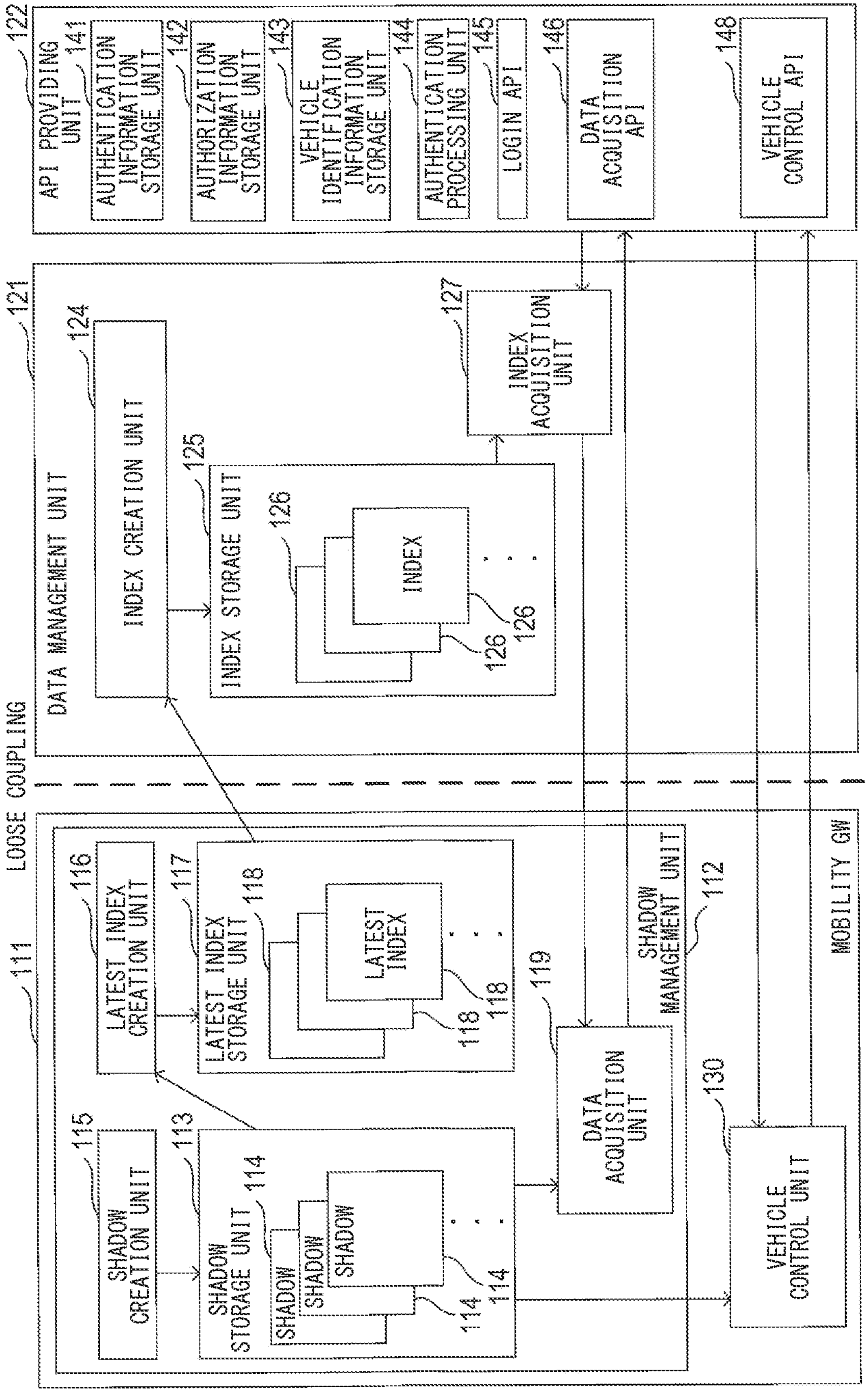
FIG. 10 is a functional block diagram showing functional configurations of a mobility GW and a data management unit.

As shown in FIG. 10, the shadow management unit 112 includes a shadow creation unit 115, a shadow storage unit 113, a latest index creation unit 116, and a latest index storage unit 117 as a configuration for implementing a function of accumulating vehicle data acquired from the edge device 2.

Each time vehicle data is transmitted from the edge device 2, the shadow creation unit 115 updates the standardized vehicle data by overwriting the corresponding area of the structured standardized vehicle data with the transmitted vehicle data. That is, standardized vehicle data is provided for each vehicle and updated asynchronously.

The shadow creation unit 115 simultaneously creates new shadows 114 for all vehicles at regular cycles by using the updated standardized vehicle data. The shadow creation unit 115 accumulates the created shadows 114 in the shadow storage unit 113. Accordingly, the shadow storage unit 113 stores multiple shadows 114 created in time series for each vehicle. That is, the shadow 114 can be regarded as a copy of the state of the edge-equipped vehicle at a certain point of time.

As shown in FIG. 11, the shadow 114 includes a vehicle data storage unit 114*a* and a device data storage unit 114*b*.

The vehicle data storage unit 114*a* stores "object-id", "Shadow_version", and "mobility-data" as data related to the edge-equipped vehicle.

The item "object-id" is a character string that identifies a vehicle equipped with the edge device 2, and functions as a partition key.

The item "Shadow_version" is a numerical value indicating the version of the shadow 114, and a time stamp indicating setting of the creation time at each time when the shadow 114 is created.

The item "mobility-data" is the value of standardized vehicle data at the time represented by the time stamp.

The device data storage unit 114*b* stores "object-id", "update_time", "version", "power_status", "power_status_timestamp", and "notify_reason" as data related to the hardware, software, and status installed in the edge device 2.

The item "object-id" is a character string that identifies a vehicle equipped with the edge device 2, and functions as a partition key.

The item "update_time" is a numerical value indicating the update time of hardware and software.

The item "version" is a character string indicating the version of hardware and software.

The item "power_status" is a character string indicating the system status of the edge device 2. Specifically, there are a "power-on" status in which all functions can be used, and a "power-off" status in which some functions are stopped to reduce power consumption.

The item "power_status_timestamp" is a numerical value indicating the notification time of the system status.

The item "notify_reason" is a character string indicating the reason for notification.

The items "version", "power_status", "notify_reason", and the like stored in the device data storage unit 114*b* are notified separately from the standardized vehicle data from the edge device 2 when a change occurs.

Referring back to FIG. 10, the latest index creation unit 116 acquires the latest shadow 114 for each vehicle from the shadow storage unit 113 and creates a latest index 118 using the acquired shadow 114. The latest index creation unit 116 stores the created latest index 118 in the latest index storage unit 117. The latest index storage unit 117 stores one latest index 118 for each vehicle (that is, for each object-id).

As shown in FIG. 12, the latest index 118 stores "gateway-id", "object-id", "shadow-version", "vin", "location-Ion", "location-lat", and "location-alt".

The items "object-id" and "shadow-version" are the same as those described for the shadow 114.

The item "gateway-id" is information for identifying the mobility GW 111. This is information for identifying multiple management servers 3, for example, when the multiple management servers 3 are provided for each country.

The item "vin" is a unique registration number assigned to the edge-equipped vehicle.

The item "location-lon" is information indicating the longitude at which the edge-equipped vehicle is present.

The item "location-lat" is information indicating the latitude at which the edge-equipped vehicle is present.

The "location-alt" is information indicating the altitude at which the edge-equipped vehicle is present.

Referring back to FIG. 10, the data management unit 121 includes an index creation unit 124 and an index storage unit 125 as a configuration for implementing a function of accumulating the latest index 118 acquired from the shadow management unit 112 as an index 126.

The index creation unit 124 acquires the latest index 118 from the latest index storage unit 117 according to a preset acquisition schedule, and creates an index 126 for the digital twin 123 using the acquired latest index 118. The index creation unit 124 sequentially stores the created indexes 126 in the index storage unit 125. Accordingly, the index storage unit 125 stores multiple indexes 126 created in time series for each vehicle. That is, each of the indexes 126 stored in the index storage unit 125 represents a vehicle that exists on the digital twin 123, which is virtual time and space.

As shown in FIG. 13, the index 126 stores "timestamp", "schedule-type", "gateway-id", "object-id", "shadow-version", "vin", "location", and "alt".

The item "timestamp" is a time stamp indicating the time in milliseconds when the index 126 was created.

The item "schedule-type" indicates whether or not the scheduler that created the data is regular or an event. When the scheduler is regular, "schedule-type" is set to 'Repeat', and when the scheduler is an event, "schedule-type" is set to "Event".

The items "gateway-id", "object-id", "shadow-version", and "vin" are information inherited from the latest index 118.

The item "location" is information inherited from "location-Ion" and "location-lat" of the latest index 118, and the item "alt" is information inherited from "location-alt" of the latest index 118.

[3-2-2. Service Provision Function]

As shown in FIGS. 9 and 10, the service-side unit 120 includes the API providing unit 122. The API providing unit 122 is an interface prepared to allow an external service provider such as the service server 5 to use the functions of the management server 3. Hereinafter, a user of the mobility IoT system 1 who uses the API providing unit 122 or the like is referred to as a service user. A service user is, for example, a service provider that makes home deliveries to a trunk of a vehicle.

The API providing unit 122 includes an authentication information storage unit 141, an authorization information storage unit 142, a vehicle identification information storage unit 143, and an authentication processing unit 144, as shown in FIG. 10. As types of APIs provided to service users, a login API 145, a data acquisition API 146, and a vehicle control API 148 are provided.

The authentication information storage unit 141 stores "authentication information" in association with a "service user ID". The item "service user ID" is identification information for uniquely identifying a service user. The item "authentication information" is a preset password.

The authorization information storage unit 142 stores "authorization information" in association with a "service user ID". The item "authorization information" is information designating, for each service user, the range of available services among all the services provided by the management server 3.

The vehicle identification information storage unit 143 stores table information in which the "object-id" uniquely assigned to the edge-equipped vehicle is associated with the "vin" of the edge-equipped vehicle.

The authentication processing unit 144 performs an authentication process when an authentication request is made via the login API 145, and performs an authorization process when an access request is made via the data acquisition API 146 and the vehicle control API 148.

The login API 145 is used when logging into the management server 3. When the login API 145 receives an authentication request from the service user, the authentication processing unit 144 performs an authentication process. In the authentication process, the "service user ID" and "authentication information" input by the login API 145 are collated with the registered contents of the authentication information storage unit 141. When the information matches as a result of collation, that is, when the authentication is successful, access to the management server 3 is permitted.

The data acquisition API 146 is an API used to access vehicle data (that is, the index 126 and the shadow 114) accumulated in the management server 3, as indicated by L1 in FIG. 9. The vehicle control API 148 is an API used to access edge-equipped vehicles, as indicated by L2 in FIG. 9.

The data acquisition API 146 and the vehicle control API 148 may perform an authorization process upon receiving an access request from a service user. An authorization process is a process for permitting or denying an access request according to an authority granted in advance to the service user.

The data acquisition API 146 and the vehicle control API 148 may use either "object-id" or "vin" as information for specifying the vehicle. When "vin" is used as the information for specifying the vehicle, the vehicle identification information storage unit 143 may be referenced to convert the information for specifying the vehicle from "vin" to "object-id".

[3-3. Data Acquisition Function]

As shown in FIG. 10, the management server 3 includes an index acquisition unit 127 and a data acquisition unit 119 as a configuration for processing access requests (hereinafter referred to as data acquisition requests) via the data acquisition API 146.

A data acquisition process performed by the index acquisition unit 127 and the data acquisition unit 119 when the data acquisition API 146 receives a data acquisition request from the service user will be described.

The data acquisition request includes vehicle designation information, time designation information, and data designation information.

The vehicle designation information is information for designating a vehicle that provides vehicle data (hereinafter referred to as a target vehicle). The vehicle designation information includes a method of listing the vehicle IDs (that is, object-id or vin) of the target vehicle in the form of a list, and a method of designating a geographical area where the target vehicle exists (hereinafter referred to as area designation).

The time designation information is information for designating a timing at which the data was generated. The time designation information is represented by a starting time and a range. The range is, for example, a value in which the time width is represented by an integer equal to or greater than 1, with a generation cycle of the latest index 118 being the unit time.

The data designation information is information for designating data to be acquired. The data designation information may be represented in the form of a list of item names of data indicated in the standardized vehicle data, or may be represented by designating category names indicated in the standardized vehicle data. A category name being designated corresponds to all items belonging to that category being designated. When neither the item name nor the category name is designated, the data designation information corresponds to all items being designated.

The method of setting the vehicle designation information, the time designation information, and the data designation information shown here is an example, and the present disclosure is not limited to the above method.

The index acquisition unit 127 extracts all indexes 126 having "timestamp" within the time range indicated in the time designation information for all vehicles specified by the vehicle designation information indicated in the data acquisition request.

The index acquisition unit 127 generates shadow specifying information by combining the "object-id" and "shadow-version" shown in the index 126 for each extracted index 126. Accordingly, a shadow list listing shadow specifying information is generated.

The index acquisition unit 127 outputs a shadow access request, to the data acquisition unit 119 of the shadow management unit 112, in which the data designation information indicated in the data acquisition request is added to the generated shadow list.

That is, the index acquisition unit 127 uses the vehicle designation information and the time designation information indicated in the data acquisition request from the data acquisition API 146 as acquisition conditions, and generates the shadow list according to these acquisition conditions. The index acquisition unit 127 also outputs a shadow access request obtained by combining the generated shadow list and the data designation information, to the data acquisition unit 119.

When the shadow access request is input from the index acquisition unit 127, the data acquisition unit 119 refers to the shadow storage unit 113 to extract the shadow 114 corresponding to each piece of shadow specifying information indicated in the shadow list of the shadow access request. The data acquisition unit 119 extracts designated data, which is data indicated in the data designation information of the shadow access request, from each of the extracted shadows 114, and returns the extracted designated data as an access result to the data acquisition API 146, which is the source of the request.

[3-4. Vehicle Control Function]

As shown in FIG. 10, the management server 3 includes a vehicle control unit 130 as a configuration for processing an access request (hereinafter referred to as a vehicle control request) via the vehicle control API 148.

A vehicle control process performed by the vehicle control unit 130 when the vehicle control API 148 receives a vehicle control request from the service user will be described.

The vehicle control request includes vehicle designation information, execution target information, and control designation information. The vehicle control request may further include priority information, time limit information, and vehicle authentication information.

One vehicle ID is indicated in the vehicle designation information. A vehicle specified by the vehicle ID is a target vehicle, which is a control target.

The execution target information is information for designating which application installed in the target vehicle is to execute the control content indicated in the control designation information, and indicates an application ID that identifies the application.

The control designation information indicates specific contents of control to be performed by the target vehicle. For example, the specific contents of control may include key operation of various doors such as each seat door and trunk door, operation of audio equipment such as horn and buzzer, operation of various lamps such as headlamps and hazard flashers, and operation of various sensors such as cameras and radar. The control designation information may indicate one control, or may indicate multiple controls to be performed continuously in the form of a list. The controls shown in the form of a list are performed in the order listed.

The priority information indicates the priority when transmitting the control instruction generated on the basis of the vehicle control request to the target vehicle. The priority information may be set by the service user who is the source of the request, or may be automatically set according to the content of control indicated in the control designation information.

The time limit information indicates the final time at which control is permitted in the target vehicle. The time limit information is set with, for example, the time when the vehicle control request is input plus 10 minutes as the limit. Similarly to the priority information, the time limit information may be set by the service user who is the source of the request, or may be automatically set according to the content of the control requested of the vehicle.

The vehicle authentication information is information used for determining whether or not the target vehicle can receive the control instruction, and may be composed of an owner ID and a password for identifying an owner of the target vehicle. The vehicle authentication information is maintained on the vehicle and also on service users permitted to access the vehicle.

When a vehicle control request is input from the vehicle control API 148, the vehicle control unit 130 transmits one or more control instructions generated on the basis of the vehicle control request to the target vehicle.

When the edge device 2 receives the control instruction from the management server 3, the edge device performs authentication by collating the vehicle authentication information indicated in the control instruction with the vehicle authentication information of the subject vehicle.

When the authentication succeeds, the edge device 2 causes the application specified by the execution target information to execute the control indicated in the control designation information. The edge device 2 transmits a response including the control execution result to the management server 3.

The vehicle control unit 130 that has received the response returns the content of the response to the vehicle control API 148.

4. Service Server

[4-1. Hardware Configuration]

Figure 14:
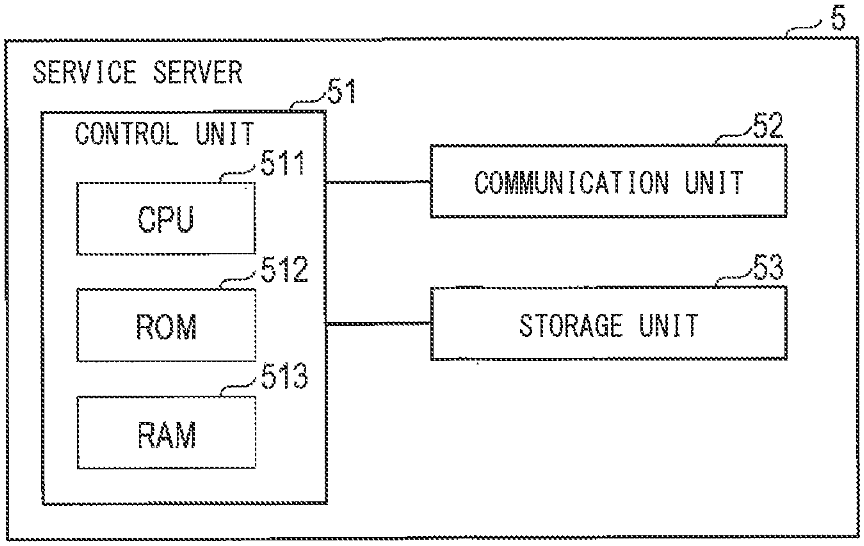
FIG. 14 is a block diagram showing a configuration of a service server.

As shown in FIG. 14, the service server 5 includes a control unit 51, a communication unit 52, and a storage unit 53.

The control unit 51 includes a CPU 511, a ROM 512, and a RAM 513. Various functions of the control unit 51 are implemented by the CPU 511 executing a program stored in a non-transitory tangible storage medium. In this example, the ROM 512 corresponds to a non-transitory tangible storage medium storing programs. A method corresponding to the program is performed by executing the program.

The communication unit 52 performs communication with the edge device 2, the management server 3, and the driver terminal 7 via a wide area communication network NW. For communication with the driver terminal 7, a network different from the network used for communication with the management server 3 may be used.

The storage unit 53 stores various types of information necessary for providing services.

[4-2. Functional Configuration]

Figure 15:
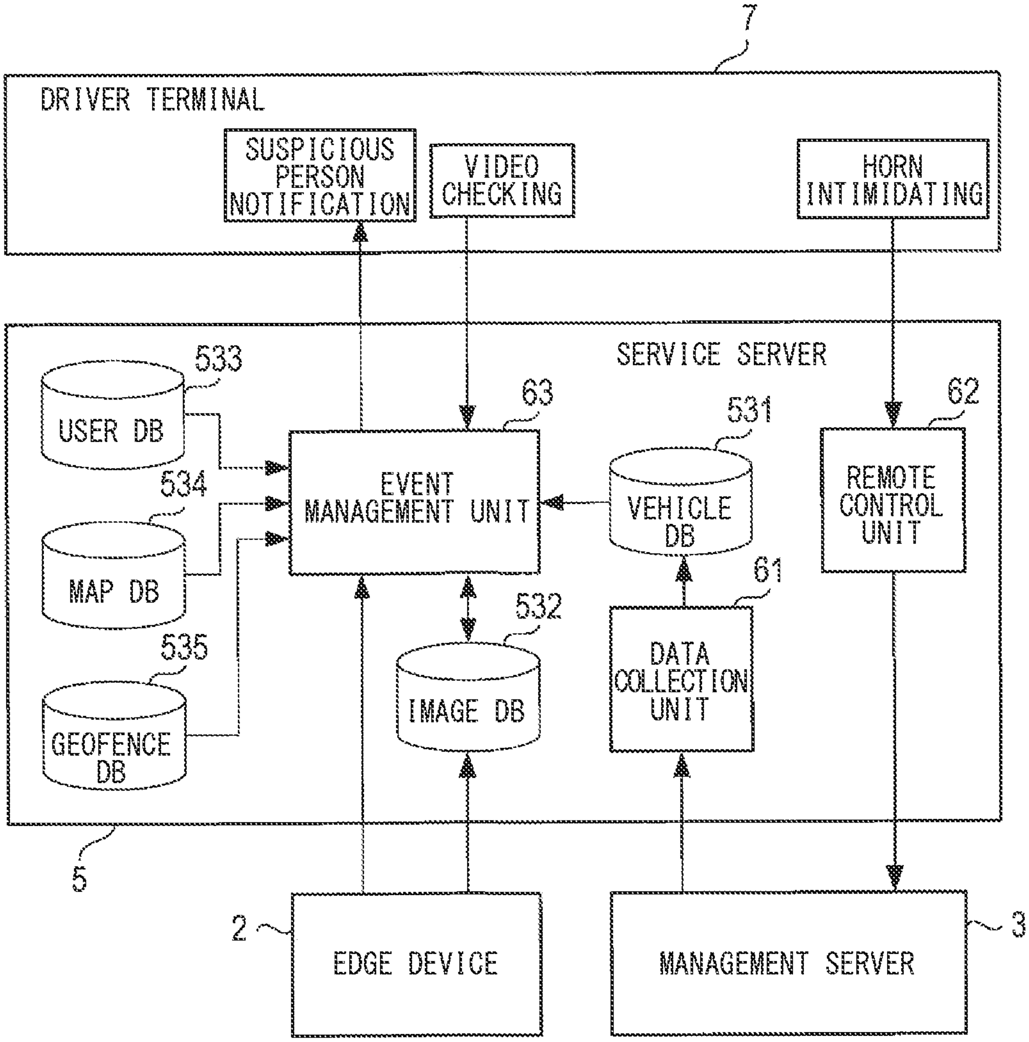
FIG. 15 is a functional block diagram showing a functional configuration of the service server.

As shown in FIG. 15, the service server 5 includes a data collection unit 61, a remote control unit 62, and an event management unit 63 when shown in blocks by function. The service server 5 also includes multiple databases (hereinafter referred to as DBs), specifically a vehicle DB 531, an image DB 532, a user DB 533, a map DB 534, and a geofence DB 535.

The vehicle DB 531 stores vehicle data acquired by the data collection unit 61 from the management server 3. The image DB 532 stores image data uploaded from the edge device 2. The user DB 533 stores user information which is the information of the user regarding a registered vehicle. The user information includes driver information, which is information about occupants including the driver of the registered vehicle, and owner information, which is information about the owner of the registered vehicle. The registered vehicle refers to a vehicle to which the service is provided among edge-equipped vehicles. For example, all edge-equipped vehicles used for home delivery services are registered vehicles. The driver information includes a vehicle ID of the registered vehicle associated with the driver and a method of contacting the driver terminal 7 (for example, telephone number, e-mail address, and the like). The map DB 534 stores map information used for navigation and the like. The geofence DB 535 stores a geofence set on the basis of the position of the registered vehicle stored in the vehicle DB 531 and the map information stored in the map DB 534. A geofence is an area enclosed by a virtual geographic boundary line.

The data collection unit 61 uses the data acquisition API provided by the management server 3 to repeatedly acquire the position information of all registered vehicles, and stores the latest position information of each registered vehicle in the vehicle DB 531.

The remote control unit 62 performs vehicle control of the designated registered vehicle by using the vehicle control API 148 provided by the management server 3 according to instructions from the driver terminal 7.

Upon receiving an event notification from the edge device 2, the event management unit 63 performs a process according to the content of the event notification.

[4-3. Event Process]

Figure 16:
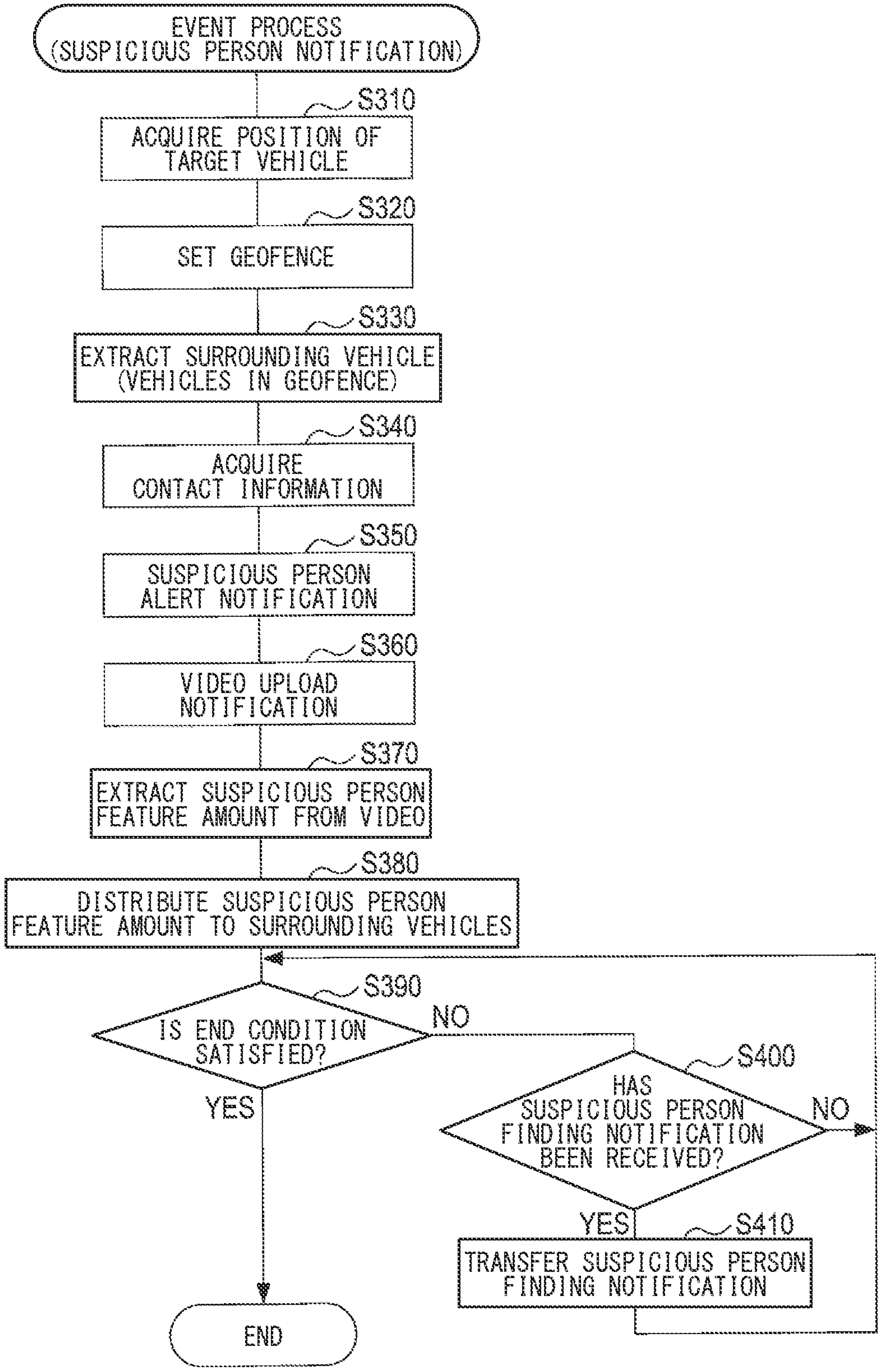
FIG. 16 is a flowchart showing an event process performed by an event management unit.

An event process performed when the event management unit 63 receives an event notification indicating that a suspicious person has been detected (that is, a suspicious person detection notification) from a registered vehicle will be described with reference to the flowchart of FIG. 16.

In S310, the CPU 511 searches the vehicle DB 531 using the transmission source information indicated in the received suspicious person detection notification to acquire the position of the registered vehicle specified from the transmission source information, that is, the edge-equipped vehicle in which the suspicious person has been detected (hereinafter referred to as the target vehicle).

In subsequent S320, the CPU 511 sets a geofence on the basis of the position of the target vehicle acquired in S310 and the map data stored in the map DB 534. The geofence may be set, for example, within a radius of 100 m centered on the position of the target vehicle. The shape and the size of the geofence may be appropriately variably set according to the event content of the event notification.

In subsequent S330, the CPU 511 searches the vehicle DB 531 to extract registered vehicles existing within the geofence (hereinafter referred to as surrounding vehicles).

In subsequent S340, the CPU 511 searches the user DB 533 to acquire driver information, particularly to acquire a method of contacting the driver terminal 7, for the target vehicle and all surrounding vehicles extracted in S330.

In subsequent S350, the CPU 511 transmits a suspicious person alert notification to the driver terminals 7 carried by the drivers associated with all the surrounding vehicles according to the method of contacting the driver terminals 7 acquired in S340.

In subsequent S360, the CPU 511 transmits a video upload notification to the driver of a target vehicle. The video upload notification is attached with the URL of the suspicious person video uploaded from the edge device 2 of the target vehicle to the service server 5. URL is an abbreviation for Uniform Resource Locator.

That is, the driver of the target vehicle can view the suspicious person video by accessing the URL attached to the video upload notification received by the driver terminal 7.

In subsequent S370, the CPU 511 extracts a suspicious person feature amount from the suspicious person video by analyzing the suspicious person video. The suspicious person feature amount is, for example, a feature amount indicating facial features, appearance features (for example, body shape, clothing features, and the like), walking features, and the like.

In subsequent S380, the CPU 511 transmits the suspicious person feature amount extracted in S370 to the edge devices 2 of all surrounding vehicles via the communication unit 52.

The edge device 2 of the surrounding vehicle that has received the suspicious person feature amount performs the information provision process described with reference to FIG. 7.

In subsequent S390, the CPU 511 determines whether or not an end condition of the event process is satisfied. For example, the CPU 511 may determine that the end condition is satisfied when an end instruction is received from the driver associated with the target vehicle and when a certain period of time has elapsed after the event process was started. When the CPU 511 determines that the end condition is satisfied, the process ends, and when the CPU determines that the end condition is not satisfied, the process proceeds to S400.

In subsequent S400, the CPU 511 determines whether or not a suspicious person finding notification has been received from the edge device 2 of the surrounding vehicle. When the CPU 511 determines that the suspicious person finding notification has been received, the process proceeds to S410, and when the CPU determines that the suspicious person finding notification has not been received, the process returns to S390.

In S410, the CPU 511 transfers the suspicious person finding notification received from the edge device 2 of the surrounding vehicle to an administrator, and returns the process to S390. The administrator is, for example, a support center staff who supports the services provided by the service server 5.

5. Driver Terminal

A terminal application is installed in the driver terminal 7. The terminal application uses a graphic user interface (hereinafter referred to as a GUI), and has functions of displaying notifications from the service server 5, playing suspicious person videos, and instructing the service server 5 to perform vehicle control.

A video viewing screen, a menu button, and the like are displayed on the GUI of the terminal application. Menu buttons include a video playback button and a vehicle control button.

When the terminal application receives the suspicious person notification, the terminal application may display an icon or the like indicating that the suspicious person notification has been received on the display screen of the driver terminal 7, and also use audio equipment or the like mounted on the driver terminal 7 to give a notification by voice or vibration.

When the driver terminal 7 receives the video upload notification from the service server 5, the terminal application activates the video playback button. The terminal application plays the suspicious person video on the video viewing screen when the activated video playback button is operated.

The terminal application activates the vehicle control button when the suspicious person video is played. The terminal application instructs the service server 5 to perform vehicle control when the activated vehicle control button is operated. When there are multiple vehicle controls that can be performed, a vehicle control button may be prepared for each type of vehicle control.

6. Operation

The operation of the mobility IoT system 1 as a whole will be described with reference to the sequence diagrams of FIGS. 17 and 18.

[6-1. Normal Operation]

Figure 17:
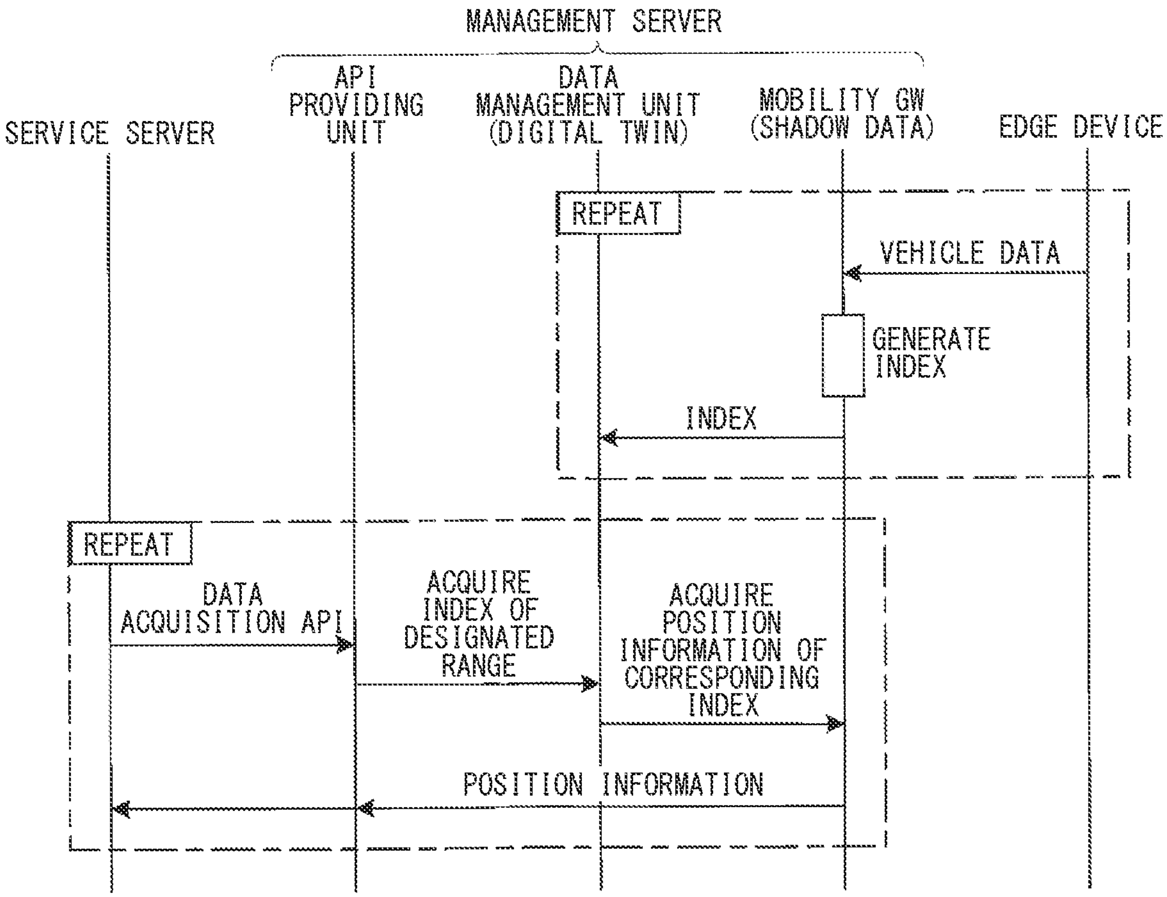
FIG. 17 is a sequence diagram showing a normal operation of the mobility IoT system.

As shown in FIG. 17, normally, the edge device 2 repeatedly transmits the vehicle data of the edge-equipped vehicle to the management server 3 according to the schedule.

The mobility GW 111 of the management server 3 accumulates the received vehicle data as the shadow 114 and generates the latest index 118. The data management unit 121 of the management server 3 accumulates the latest index 118 as the digital twin 123. The digital twin 123 includes at least the identification information and position information of all edge-equipped vehicles.

Figure 19:
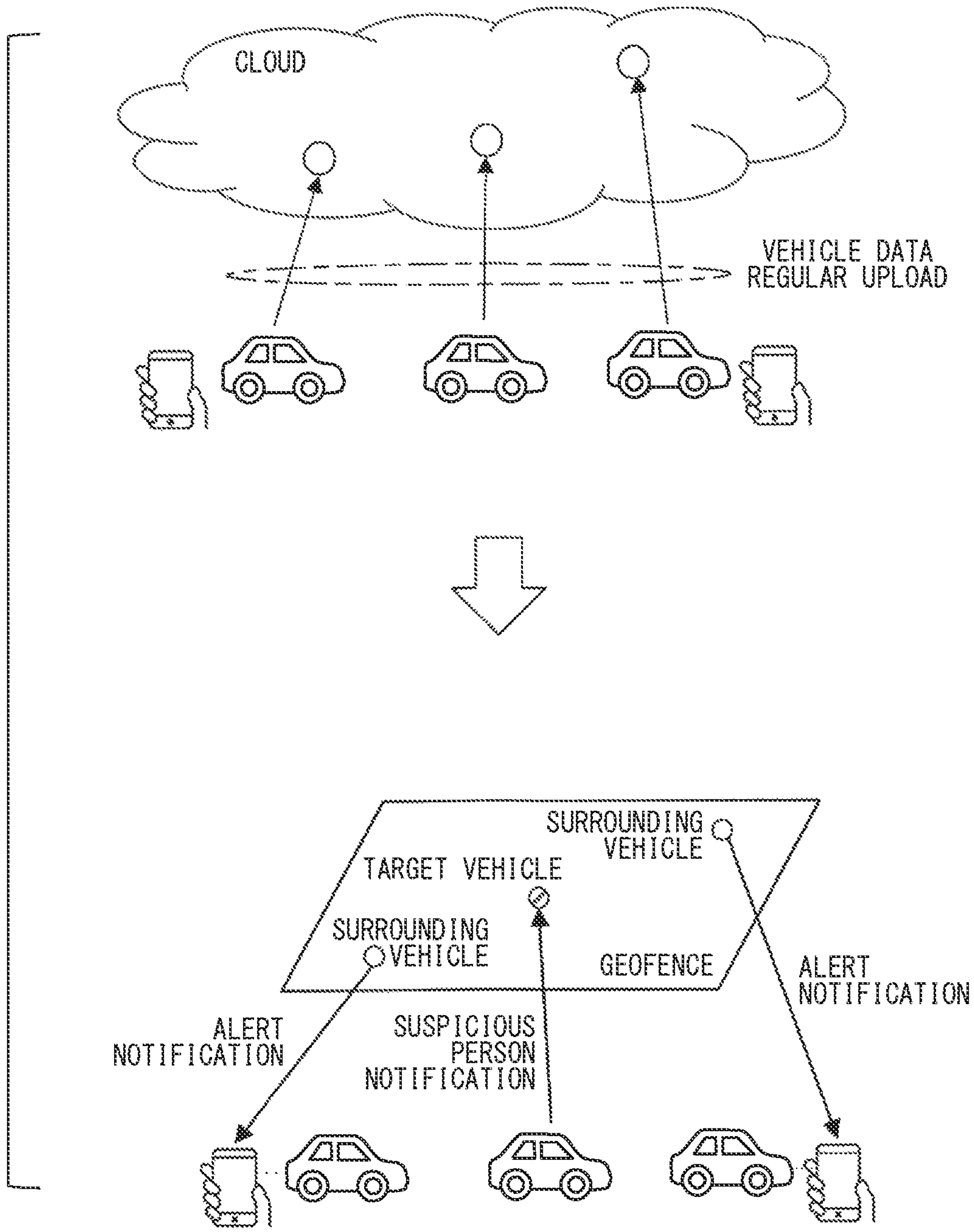
FIG. 19 is an explanatory diagram showing an overview of services provided by the suspicious person detection application.

That is, as shown in the upper part of FIG. 19, the vehicle data of all edge-equipped vehicles are accumulated in the management server 3 on the cloud while being sequentially updated as the shadow 114 and the digital twin 123.

The data collection unit 61 of the service server 5 uses the data acquisition API 146 provided by the management server 3 to repeatedly acquire the position information of all registered vehicles existing within the service provision range of the service server 5, and stores the latest position information in the vehicle DB 531. Edge-equipped vehicles used for the home delivery service of the home delivery company are registered vehicles.

In the data acquisition request input to the data acquisition API 146, for example, the service provision range is set as position designation information, the current time is set as time designation information, and position information is set as acquisition information. The data management unit 121 generates an object list that designates object IDs and current times of all registered vehicles existing within the designated service range. The mobility GW 111 then extracts the latest position information from the shadow 114 according to the object list and returns it to the service server 5.

[6-2. Operation when Event is Detected]

Figure 18:
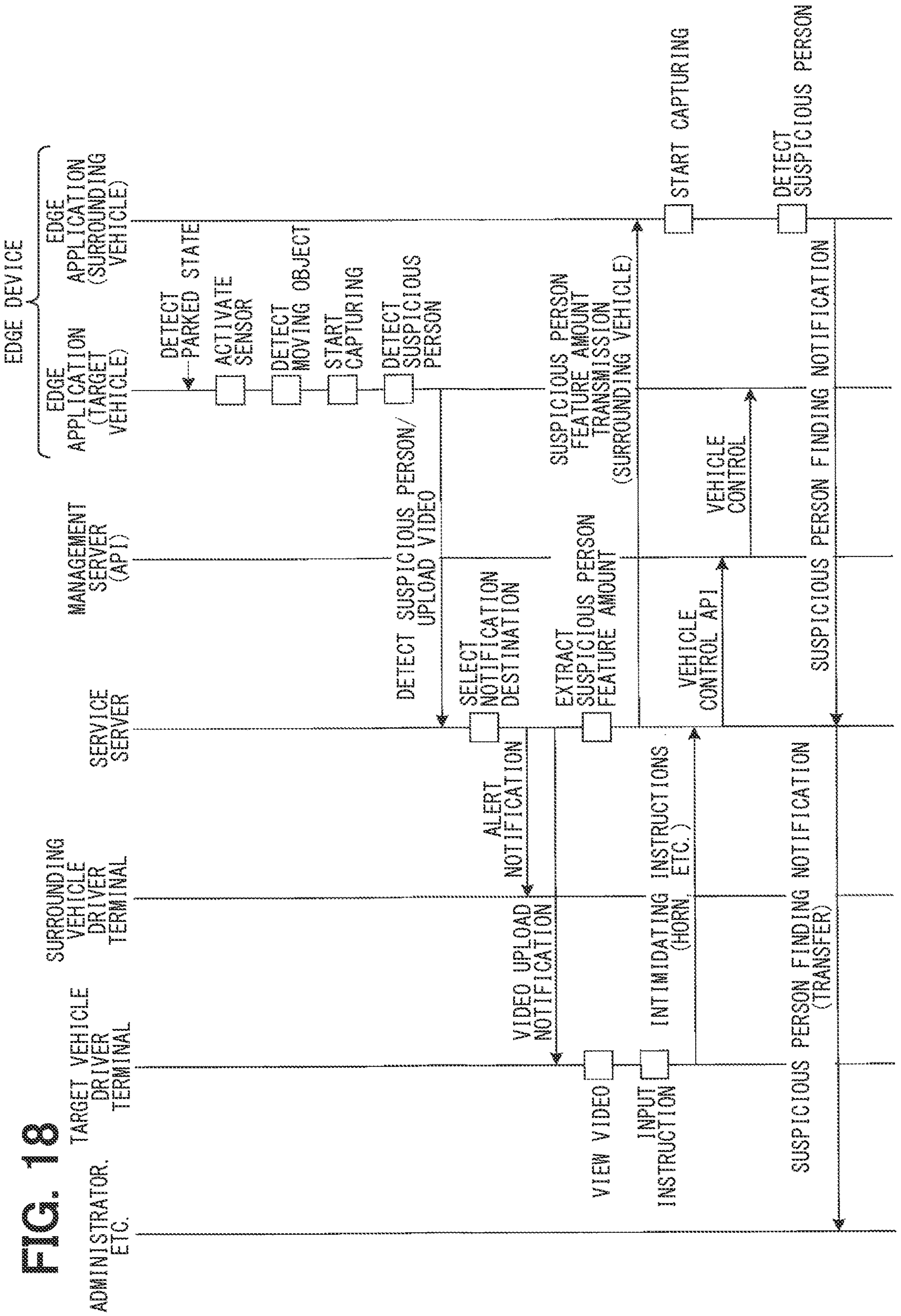
FIG. 18 is a sequence diagram showing an operation of the mobility IoT system when an event is detected in the edge device.

As shown in FIG. 18, the edge device 2 activates the surrounding monitoring sensor when detecting the parked state of the edge-equipped vehicle. When the surrounding monitoring sensor detects a moving object, the edge device 2 activates the video camera and starts capturing.

That is, for example, when a delivery person leaves the vehicle during delivery and a suspicious person approaching the vehicle is detected by the surrounding monitoring sensor, the video camera starts capturing.

When a suspicious person is detected from the captured image, the edge device 2 transmits an event notification indicating that the suspicious person has been detected (that is, a suspicious person detection notification) to the service server 5. The edge device 2 uploads, to the service server 5, a suspicious person video, which is a video including the part where the suspicious person is detected.

As shown in the lower part of FIG. 19, when the service server 5 receives the suspicious person detection notification, the service server 5 selects a surrounding vehicle serving as a notification destination, and transmits an alert notification to the driver terminal 7 of the driver associated with the selected surrounding vehicle. A geofence is used to select a notification destination. A geofence is set based on the position of the target vehicle specified from the transmission source information of the suspicious person detection notification. All registered vehicles existing within the geofence are surrounding vehicles. The service server 5 may also transmit the alert notification to the target vehicle.

Referring back to FIG. 18, when the suspicious person video is uploaded from the edge device 2, the service server 5 transmits a video upload notification to which the URL of the suspicious person video is attached to the driver terminal 7 of the driver associated with the target vehicle. This video upload notification also serves as an alert notification for the target vehicle. The service server 5 analyzes the suspicious person video, extracts the feature amount of the suspicious person, and transmits the extracted feature amount to the edge device 2 of the surrounding vehicle.

A driver of a surrounding vehicle, that is, another driver who is performing home delivery work around the target vehicle, receives the suspicious person alert notification via his/her own driver terminal 7, thereby ascertaining the presence of a suspicious person nearby.

The driver of the target vehicle can ascertain the situation by viewing the suspicious person video via his/her own driver terminal 7. The driver of the target vehicle can instruct the service server 5 to perform vehicle control via the driver terminal 7 as necessary.

When receiving a vehicle control instruction from the driver terminal 7, the service server 5 uses the vehicle control API 148 of the management server 3 to access the edge device 2 of the target vehicle, and causes the edge device 2 to perform vehicle control. The vehicle control may, for example, sound the horn of the target vehicle or flash the lamp of the target vehicle in order to intimidate the suspicious person.

When the feature amount of the suspicious person is received from the service server 5, the edge device 2 of the surrounding vehicle activates a video camera for capturing an image of the surroundings of the vehicle and starts capturing. The edge device 2 of the surrounding vehicle analyzes the captured image and detects a suspicious person by comparing the analysis result with the received feature amount. The edge device 2 of the surrounding vehicle transmits a suspicious person finding notification including an image of the detected suspicious person, to the service server 5. The service server 5 stores the information indicated in the suspicious person finding notification, and transfers the suspicious person finding notification to an administrator or the like.

7. Correspondence of Terms

In the present embodiment, the mobility IoT system 1 corresponds to an information notification system in the present disclosure. The management server 3 and the service server 5 correspond to a management device in the present disclosure. The management server 3 corresponds to a first management unit in the present disclosure. The service server 5 corresponds to a second management unit in the present disclosure. The basic upload unit 261 corresponds to a data providing unit in the present disclosure.

In the present embodiment, S180 corresponds to an event transmission unit in the present disclosure. S190 corresponds to a video transmission unit in the present disclosure. S210 to S270 correspond to a target object detection unit in the present disclosure. S310 and S320 correspond to a geofence setting unit in the present disclosure. S330 and S340 correspond to a notification destination selection unit in the present disclosure. S350 corresponds to a notification unit in the present disclosure. S370 and S380 correspond to a feature amount distribution unit in the present disclosure. The alert notification and the video upload notification correspond to an alert notification in the present disclosure. The suspicious person video corresponds to an event video in the present disclosure. The suspicious person corresponds to a detection target object in the present disclosure.

8. Advantageous Effects

According to the first embodiment described in detail above, the following effects are obtained.

(8a) In the mobility IoT system 1, when a suspicious person approaching a target vehicle in a parked state is detected, not only a driver (that is, a delivery person) associated with the target vehicle is notified, but also drivers associated with surrounding vehicles are notified. Therefore, it is possible to call attention to all delivery persons who are working near a position where the suspicious person is detected. In other words, it is possible to cope with the situation of suspicious person detection in cooperation with not only the driver of the target vehicle but also the drivers of the surrounding vehicles.

(8b) In the mobility IoT system 1, when a suspicious person is detected in the target vehicle, since the driver of the target vehicle can view the suspicious person video using his/her own driver terminal 7, it is possible to quickly ascertain the situation of the target vehicle and the suspicious person.

(8c) In the mobility IoT system 1, since the driver of the target vehicle can remotely control the horn and lamp of the target vehicle via his/her own driver terminal 7, it is possible to audibly or visually intimidate a suspicious person as necessary.

(8d) In the mobility IoT system 1, the feature amount of the suspicious person extracted from the suspicious person video is distributed to the edge device 2 of the surrounding vehicle, the edge device 2 of the surrounding vehicle detects the suspicious person using the feature amount of the suspicious person and uploads the detection information to the service server 5. Therefore, by checking the detection information obtained from the edge device 2 of the surrounding vehicle, the behavior of the suspicious person can be ascertained.

9. Other Embodiments

Although the embodiments of the present disclosure have been described above, the present disclosure is not limited to the embodiments described above, and various modifications can be made to implement the present disclosure.

(9a) Although the suspicious person information provision service using the suspicious person detection application A1 has been described in the present disclosure, the same mechanism may be applied to a hit-and-run information provision service using the hit-and-run detection application A2.

The hit-and-run detection application assumes that when the driver leaves the edge-equipped vehicle in a parked state, another vehicle hits and runs. The edge device 2 is detected by an acceleration sensor mounted on the vehicle, but is different in that it uses the collision vibration as a trigger to activate the video camera, and to extract the feature amount of the vehicle that hits and runs instead of the suspicious person from the captured image. The feature amount in this case may include a license plate number of the vehicle. In the hit-and-run information provision service, since a moving speed of a hit-and-run vehicle is faster than a moving speed of a suspicious person, the range of the geofence generated by the service server 5 may be set wider than that of the suspicious person information provision service, for example, a radius of 3 km.

(9b) In the present disclosure, detection of a suspicious person and detection of a hit-and-run are exemplified as events to be handled, but events are not limited thereto.

(9c) The control units 21, 31, and 51 and techniques thereof described in the present disclosure may be implemented by a dedicated computer provided by configuring a processor and a memory programmed to execute one or more functions embodied by a computer program. Alternatively, the control units 21, 31, and 51 and techniques thereof described in the present disclosure may be implemented by a dedicated computer provided by configuring the processor with one or more dedicated hardware logic circuits. Alternatively, the control units 21, 31, and 51 and techniques thereof described in the present disclosure may be implemented by one or more dedicated computers configured with a combination of a processor and a memory programmed to execute one or more functions, and a processor configured with one or more hardware logic circuits. The computer programs may also be stored in a computer readable non-transitory tangible recording medium as computer executable instructions. The method of implementing the function of each part included in the control units 21, 31, and 51 does not necessarily include software, and all the functions may be implemented using one or more pieces of hardware.

(9d) Multiple functions of one component in the above embodiment may be implemented by multiple components, or a function of one component may be implemented by multiple components. Multiple functions of multiple components may be implemented by one component, or one function implemented by multiple components may be implemented by one component. A part of the configuration of the above embodiment may be omitted. At least a part of the configuration of the above embodiment may be added to or substituted for the configuration of the other above embodiment.

(9e) In addition to the mobility IoT system, management device, and edge device as the information notification system described above, the present disclosure can also be implemented in various forms, such as a program for causing a computer to function as the management device and the edge device, a non-transitory tangible storage medium such as a semiconductor memory recording this program, and an information notification method.

The invention claimed is:

1. An information notification system, comprising:

a management device including a first management unit having a first processor and memory and a second management unit having a second processor and memory; and a plurality of edge devices mounted in a plurality of vehicles and having a core function execution unit communicating with the first management unit and an application execution unit communicating with the second management unit, wherein each of the edge devices includes a third processor and memory configured to implement:

in the core function execution unit, a data providing unit configured to collect vehicle data including position information of an edge-equipped vehicle that is equipped with the edge device, and a state of the edge-equipped vehicle when the edge-equipped vehicle stops, and provide the vehicle data to the first management unit; and in the application execution unit, an event transmission unit configured to detect occurrence of a preset event involving the edge-equipped vehicle and transmit, to the second management unit, an event notification including identification information for identifying the edge-equipped vehicle and type information indicating a type of the event, the first processor and memory of the first management unit are configured to implement a storage unit configured to store the vehicle data repeatedly acquired from each of the edge devices, and the second processor and memory of the second management unit are configured to implement:

a data collection unit configured to collect the vehicle data stored in the storage unit from the first management unit;

a receiving unit configured to receive the event notification transmitted from each of the edge devices of registered vehicles, which are one or more of the edge-equipped vehicles and have been registered;

a geofence setting unit configured to (i) identify a position of the edge-equipped vehicle, which has stopped and is one of the registered vehicles to which the event has occurred, according to the identification information indicated in the event notification and the vehicle data collected by the data collection unit, when the event notification is received, and (ii) set a geofence with reference to the position of the having-stopped edge-equipped vehicle, wherein at least one of a size and a shape of the geofence are variably set according to the type information;

a notification destination selection unit configured to select, from among the registered vehicles that are within the geofence, notification destinations of information in association with the event using the geofence set by the geofence setting unit and the vehicle data collected by the data collection unit; and a notification unit configured to transmit, to each of the notification destinations selected by the notification destination selection unit, an alert notification for calling attention according to the type information indicated in the event notification.

2. The information notification system according to claim 1, wherein the second management unit further includes a user database configured to store information that associates the registered vehicles with user terminals that are mobile terminals carried by users of the registered vehicles, and the notification destination selection unit is configured to identify one or more registered vehicles among the registered vehicles that are located within the geofence and select the user terminals associated with the identified registered vehicles in the user database as the notification destinations.

3. The information notification system according to claim 1, wherein the third processor and memory of each of the edge devices are further configured to implement a video transmission unit configured to transmit, to the second management unit, an event video that is a moving image of surroundings of the edge-equipped vehicle captured when the event is detected, the second management unit further includes an image database configured to store the event video received from each of the edge devices, and the notification unit is configured to include, in the alert notification, information for accessing the event video stored in the image database.

4. The information notification system according to claim 3, wherein the second processor and memory of the second management unit are further configured to implement a feature amount distribution unit configured to:

extract a feature amount of a detection target object according to the type information from the event video stored in the image database; and distribute the feature amount of the detection target object to the edge devices mounted in the one or more registered vehicles located within the geofence, and the third processor and memory of each of the edge devices are further configured to implement a target object detection unit configured to notify the second management unit of a detection result if the detection target object is detected from an image of surroundings of the edge-equipped vehicle captured by a camera mounted in the edge-equipped vehicle using the feature amount distributed from the second management unit.

5. The information notification system according to claim 1, wherein the first processor and memory of the first management unit are further configured to implement a vehicle control unit configured to control a designated edge-equipped vehicle among the edge-equipped vehicles to perform designated vehicle control, and the second processor and memory of the second management unit are further configured to implement a remote control unit configured to control, using the vehicle control unit of the first management unit, the edge-equipped vehicle to perform control according to an instruction from a driver terminal carried by a driver of the edge-equipped vehicle.

6. The information notification system according to claim 1, wherein the storage unit is configured to store (i) a shadow in which the vehicle data acquired from the edge devices is associated with an acquisition time of the vehicle data and (ii) an index including vehicle identification information and vehicle position information extracted from the shadow.

7. A management device, comprising:

a first management unit having a first processor and memory; and a second management unit having a second processor and memory, wherein the management device constitutes an information notification system together with a plurality of edge devices mounted in a plurality of vehicles and having a core function execution unit communicating with the first management unit and an application execution unit communicating with the second management unit, each of the edge devices includes a third processor and memory configured to:

with the core function execution unit, collect vehicle data including position information of an edge-equipped vehicle that is equipped with the edge device, and a state of the edge-equipped vehicle when the edge-equipped vehicle stops; and provide the vehicle data to the first management unit; and with the application execution unit, detect occurrence of a preset event involving the edge-equipped vehicle of the plurality of vehicles; and transmit, to the second management unit, an event notification including identification information for identifying the edge-equipped vehicle and type information indicating a type of the event, the first processor and memory of the first management unit are configured to implement a storage unit configured to store the vehicle data repeatedly acquired from each of the edge devices, and the second processor and memory of the second management unit are configured to implement:

a data collection unit configured to collect the vehicle data stored in the storage unit from the first management unit;

a receiving unit configured to receive the event notification transmitted from the edge devices of registered vehicles that are one or more of the edge-equipped vehicles and have been registered;

a geofence setting unit configured to, when the event notification is received:

i) identify a position of the edge-equipped vehicle, which has stopped and is one of the registered vehicles to which the event has occurred, according to the identification information indicated in the event notification and the vehicle data collected by the data collection unit; and ii) set a geofence with reference to the position of the having-stopped edge-equipped vehicle, wherein at least one of a size and a shape of the geofence are variably set according to the type information;

a notification destination selection unit configured to select, from among the registered vehicles that are within the geofence, notification destinations of information in association with the event using the geofence set by the geofence setting unit and the vehicle data collected by the data collection unit; and a notification unit configured to transmit an alert notification for calling attention according to the type information indicated in the event notification to each of the notification destinations selected by the notification destination selection unit.

8. An edge device that is mounted in a subject vehicle, the edge device constituting an information notification system together with a management device including a first management unit having a first processor and memory and a second management unit having a second processor and memory, the edge device having a third processor and memory, the first management unit being configured to store vehicle data repeatedly acquired from the edge device and other edge devices of edge-equipped vehicles that are vehicles equipped with the other edge devices, the edge device and the other edge devices each having a core function execution unit communicating with the first management unit and an application execution unit communicating with the second management unit, the second management unit being configured to: collect the vehicle data from the first management unit, when an event notification transmitted from the edge devices of registered vehicles that are a plurality of vehicles including the subject vehicle and one or more of the edge-equipped vehicles and have been registered is received; identify a position of the edge-equipped vehicle of the plurality of vehicles, which has stopped and is one of the registered vehicles to which an event has occurred, according to identification information indicated in the event notification and the vehicle data; set a geofence with reference to the position of the having-stopped edge-equipped vehicle, wherein at least one of a size and a shape of the geofence are variably set according to type information indicating a type of the event; select, from among the registered vehicles that are within the geofence, notification destinations of information in association with the event using the geofence and the vehicle data; and transmit, to each of the selected notification destinations, an alert notification for calling attention according to the type information indicated in the event notification, the third processor and memory of the edge device being configured to implement:

in the core function execution unit, a data providing unit configured to:

collect the vehicle data including position information of the subject vehicle, and a state of the edge-equipped vehicle when the edge-equipped vehicle stops; and provide the vehicle data to the first management unit; and in the application execution unit, an event transmission unit configured to:

detect occurrence of the event; and transmit, to the second management unit, the event notification including the identification information for identifying the subject vehicle and the type information indicating the type of the event.

9. An information notification method performed by an information notification system including a management device and a plurality of edge devices mounted in a plurality of vehicles and having a core function execution unit communicating with a first management unit and an application execution unit communicating with a second management unit, the management device including the first management unit and the second management unit, the information notification method comprising:

by each of the edge devices, with the core function execution unit, collecting vehicle data including position information of an edge-equipped vehicle that is equipped with the edge device, and a state of the edge-equipped vehicle when the edge-equipped vehicle stops;

providing the vehicle data to the first management unit; and with the application execution unit, detecting occurrence of a preset event involving the edge-equipped vehicle and transmitting, to the second management unit, an event notification including identification information for identifying the edge-equipped vehicle and type information indicating a type of the event;

by the first management unit, storing the vehicle data repeatedly acquired from the edge devices; and by the second management unit, collecting the vehicle data from the first management unit;

receiving the event notification transmitted from each of the edge devices of registered vehicles that are one or more of the edge-equipped vehicles and have been registered;

when the event notification is received, identifying a position of the edge-equipped vehicle, which has stopped and is one of the registered vehicles to which the event has occurred, according to the identification information indicated in the event notification and the vehicle data collected by the first management unit and setting a geofence with reference to the position of the having-stopped edge-equipped vehicle, wherein at least one of a size and a shape of the geofence are variably set according to the type information;

selecting, from among the registered vehicles that are within the geofence, notification destinations of information in association with the event using the geofence and the vehicle data collected by the first management unit; and transmitting, to each of the selected notification destinations, an alert notification for calling attention according to the type information indicated in the event notification.

10. A method of operating a management device, the management device including a first management unit and a second management unit and constituting an information notification system together with a plurality of edge devices mounted in a plurality of vehicles and having a core function execution unit communicating with the first management unit and an application execution unit communicating with the second management unit, each of the edge devices being configured to: collect, with the core function execution unit, vehicle data including position information of an edge-equipped vehicle, which is a vehicle equipped with the edge device, and a state of the edge-equipped vehicle when the edge-equipped vehicle stops; provide, with the core function execution unit, the vehicle data to the first management unit; detect, with the application execution unit, occurrence of a preset event involving the edge-equipped vehicle of the plurality of vehicles; and transmit, with the application execution unit and to the second management unit, an event notification including identification information for identifying the edge-equipped vehicle and type information indicating a type of the event, the method comprising:

by the first management unit, storing the vehicle data repeatedly acquired from the edge devices; and by the second management unit, acquiring the vehicle data from the first management unit;

receiving the event notification transmitted from the edge devices of registered vehicles that are one or more of the edge-equipped vehicle and have been registered;

when the event notification is received, identifying a position of the edge-equipped vehicle, which has stopped and is one of the registered vehicles to which the event has occurred, according to the identification information indicated in the event notification and the vehicle data acquired from the first management unit, and setting a geofence with reference to the position of the having-stopped edge-equipped vehicle, wherein at least one of a size and a shape of the geofence are variably set according to the type information;

selecting, from among the registered vehicles that are within the geofence, notification destinations of information in association with the event using the geofence and the vehicle data acquired from the first management unit, and transmitting, to each of the selected notification destinations, an alert notification for calling attention according to the type information indicated in the event notification.

11. A non-transitory tangible storage medium storing a program for an edge device, the edge device being mounted in a subject vehicle and consisting of an information notification system together with a management device including a first management unit and a second management unit, the first management unit being configured to store vehicle data repeatedly acquired from the edge device and other edge devices for edge-equipped vehicles that are a plurality of vehicles equipped with the edge devices, the edge device and the other edge devices each having a core function execution unit communicating with the first management unit and an application execution unit communicating with the second management unit, the second management unit being configured to: collect the vehicle data from the first management unit, when an event notification transmitted from the edge devices of registered vehicles that are the subject vehicle and one of more of the edge-equipped vehicles and have been registered is received; identify a position of an edge-equipped vehicle, which has stopped and is one of the registered vehicles in which an event involving the edge-equipped vehicle of the plurality of vehicles has occurred, according to identification information indicated in the event notification and the vehicle data collected by the first management unit; set a geofence with reference to the position of the having-stopped edge-equipped vehicle, wherein at least one of a size and a shape of the geofence are variably set according to type information indicated in the event notification; select, from among the registered vehicles that are within the geofence, notification destinations of information in association with the event using the geofence and the vehicle data collected by the first management unit; and transmit, to each of the selected notification destinations, an alert notification for calling attention according to the type information indicated in the event notification, the program, when executed by a computer of the edge device, causing the computer to:

with the core function execution unit, collect the vehicle data including position information of the subject vehicle, and a state of the subject vehicle when the subject vehicle stops;

provide the vehicle data to the first management unit;

detect occurrence of the event; and with the application execution unit, transmit, to the second management unit, the event notification including the identification information for identifying the subject vehicle and the type information indicating a type of the event.

12. An information notification system, comprising:

a management device including a first management unit having a first processor and memory and a second management unit having a second processor and memory; and a plurality of edge devices mounted in a plurality of vehicles and having a core function execution unit communicating with the first management unit and an application execution unit communicating with the second management unit;

wherein:

each of the edge devices includes a third processor and memory configured to implement:

in the core function execution unit, a data providing unit configured to collect vehicle data including position information of an edge-equipped vehicle that is equipped with the edge device, and a state of the edge-equipped vehicle when the edge-equipped vehicle stops, and provide the vehicle data to the first management unit; and in the application execution unit, an event transmission unit configured to detect occurrence of a preset event involving the edge-equipped vehicle and transmit, to the second management unit, an event notification including identification information for identifying the edge-equipped vehicle and type information indicating a type of the event;

the first processor and memory of the first management unit are configured to implement a storage unit configured to store the vehicle data repeatedly acquired from each of the edge devices;

the second processor and memory of the second management unit are configured to implement:

a data collection unit configured to collect the vehicle data stored in the storage unit from the first management unit;

a receiving unit configured to receive the event notification transmitted from each of the edge devices of registered vehicles, which are one or more of the edge-equipped vehicles and have been registered;

a geofence setting unit configured to identify a position of the edge-equipped vehicle, which has stopped and is one of the registered vehicles to which the event has occurred, according to the identification information indicated in the event notification and the vehicle data collected by the data collection unit, when the event notification is received, and set a geofence with reference to the position of the having-stopped edge-equipped vehicle;

a notification destination selection unit configured to select, from among the registered vehicles that are in the geofence, notification destinations of information in association with the event using the geofence set by the geofence setting unit and the vehicle data collected by the data collection unit; and a notification unit configured to transmit, to each of the notification destinations selected by the notification destination selection unit, an alert notification for calling attention according to the type information indicated in the event notification; and the geofence setting unit is configured to variably set at least one of a size and a shape of the geofence according to the type information.

13. A management device, comprising:

a first management unit having a first processor and memory; and a second management unit having a second processor and memory;

wherein:

the management device constitutes an information notification system together with a plurality of edge devices mounted in a plurality of vehicles and having a core function execution unit communicating with the first management unit and an application execution unit communicating with the second management unit;

each of the edge devices includes a third processor and memory configured to:

with the core function execution unit, collect vehicle data including position information of an edge-equipped vehicle that is equipped with the edge device, and a state of the edge-equipped vehicle when the edge-equipped vehicle stops;

provide the vehicle data to the first management unit; and with the application execution unit, detect occurrence of a preset event involving the edge-equipped vehicle of the plurality of vehicles; and transmit, to the second management unit, an event notification including identification information for identifying the edge-equipped vehicle and type information indicating a type of the event;

the first processor and memory of the first management unit are configured to implement a storage unit configured to store the vehicle data repeatedly acquired from each of the edge devices;

the second processor and memory of the second management unit are configured to implement:

a data collection unit configured to collect the vehicle data stored in the storage unit from the first management unit;

a receiving unit configured to receive the event notification transmitted from the edge devices of registered vehicles that are one or more of the edge-equipped vehicles and have been registered;

a geofence setting unit configured to, when the event notification is received:

i) identify a position of the edge-equipped vehicle, which has stopped and is one of the registered vehicles to which the event has occurred, according to the identification information indicated in the event notification and the vehicle data collected by the data collection unit; and ii) set a geofence with reference to the position of the having-stopped edge-equipped vehicle;

a notification destination selection unit configured to select, from among the registered vehicles that are within the geofence, notification destinations of information in association with the event using the geofence set by the geofence setting unit and the vehicle data collected by the data collection unit; and a notification unit configured to transmit an alert notification for calling attention according to the type information indicated in the event notification to each of the notification destinations selected by the notification destination selection unit; and the geofence setting unit is configured to variably set at least one of a size and a shape of the geofence according to the type information.

14. An edge device that is mounted in a subject vehicle, the edge device constituting an information notification system together with a management device including a first management unit having a first processor and memory and a second management unit having a second processor and memory, the edge device having a third processor and memory, the first management unit being configured to store vehicle data repeatedly acquired from the edge device and other edge devices of edge-equipped vehicles that are vehicles equipped with the other edge devices, the edge device and the other edge devices each having a core function execution unit communicating with the first management unit and an application execution unit communicating with the second management unit, the second management unit being configured to: collect the vehicle data from the first management unit, when an event notification transmitted from the edge devices of registered vehicles that are a plurality of vehicles including the subject vehicle and one or more of the edge-equipped vehicles and have been registered is received; identify a position of the edge-equipped vehicle of the plurality of vehicles, which has stopped and is one of the registered vehicles to which an event has occurred, according to identification information indicated in the event notification and the vehicle data; set a geofence with reference to the position of the having-stopped edge-equipped vehicle; select, from among the registered vehicles that are within the geofence, notification destinations of information in association with the event using the geofence and the vehicle data; and transmit, to each of the selected notification destinations, an alert notification for calling attention according to type information indicated in the event notification, the third processor and memory of the edge device being configured to implement:

in the core function execution unit, a data providing unit configured to:

collect the vehicle data including position information of the subject vehicle, and a state of the edge-equipped vehicle when the edge-equipped vehicle stops; and provide the vehicle data to the first management unit; and in the application execution unit, an event transmission unit configured to:

detect occurrence of the event; and transmit, to the second management unit, the event notification including the identification information for identifying the subject vehicle and the type information indicating the type of the event;

wherein the second management unit is further configured to variably set at least one of a size and a shape of the geofence according to the type information.

15. An information notification method performed by an information notification system including a management device and a plurality of edge devices mounted in a plurality of vehicles and having a core function execution unit communicating with a first management unit and an application execution unit communicating with a second management unit, the management device including the first management unit and the second management unit, the information notification method comprising:

by each of the edge devices:

with the core function execution unit, collecting vehicle data including position information of an edge-equipped vehicle that is equipped with the edge device and a state of the edge-equipped vehicle when the edge-equipped vehicle stops;

providing the vehicle data to the first management unit; and with the application execution unit, detecting occurrence of a preset event involving the edge-equipped vehicle and transmitting, to the second management unit, an event notification including identification information for identifying the edge-equipped vehicle and type information indicating a type of the event;

by the first management unit:

storing the vehicle data repeatedly acquired from the edge devices; and by the second management unit;

collecting the vehicle data from the first management unit;

receiving the event notification transmitted from each of the edge devices of registered vehicles that are one or more of the edge-equipped vehicles and have been registered;

when the event notification is received, identifying a position of the edge-equipped vehicle, which has stopped and is one of the registered vehicles to which the event has occurred, according to the identification information indicated in the event notification and the vehicle data collected by the first management unit and setting a geofence with reference to the position of the having-stopped edge-equipped vehicle;

selecting, from among the registered vehicles that are within the geofence, notification destinations of information in association with the event using the geofence and the vehicle data collected by the first management unit; and transmitting, to each of the selected notification destinations, an alert notification for calling attention according to the type information indicated in the event notification;

wherein the second management unit is configured to variably set at least one of a size and a shape of the geofence according to the type information.

16. A method of operating a management device, the management device including a first management unit and a second management unit and constituting an information notification system together with a plurality of edge devices mounted in a plurality of vehicles and having a core function execution unit communicating with the first management unit and an application execution unit communicating with the second management unit, each of the edge devices being configured to: collect, with the core function execution unit, vehicle data including position information of an edge-equipped vehicle, which is a vehicle equipped with the edge device, and a state of the edge-equipped vehicle when the edge-equipped vehicle stops; provide, with the core function execution unit, the vehicle data to the first management unit; detect, with the application execution unit, occurrence of a preset event involving the edge-equipped vehicle of the plurality of vehicles; and transmit, with the application execution unit and to the second management unit, an event notification including identification information for identifying the edge-equipped vehicle and type information indicating a type of the event, the method comprising:

by the first management unit:

storing the vehicle data repeatedly acquired from the edge devices; and by the second management unit;

acquiring the vehicle data from the first management unit;

receiving the event notification transmitted from the edge devices of registered vehicles that are one or more of the edge-equipped vehicle and have been registered;

when the event notification is received, identifying a position of the edge-equipped vehicle, which has stopped and is one of the registered vehicles to which the event has occurred, according to the identification information indicated in the event notification and the vehicle data acquired from the first management unit, and setting a geofence with reference to the position of the having-stopped edge-equipped vehicle;

selecting, from among the registered vehicles that are within the geofence, notification destinations of information in association with the event using the geofence and the vehicle data acquired from the first management unit; and transmitting, to each of the selected notification destinations, an alert notification for calling attention according to the type information indicated in the event notification:

wherein the second management unit is configured to variably set at least one of a size and a shape of the geofence according to the type information.

17. A non-transitory tangible storage medium storing a program for an edge device, the edge device being mounted in a subject vehicle and consisting of an information notification system together with a management device including a first management unit and a second management unit, the first management unit being configured to store vehicle data repeatedly acquired from the edge device and other edge devices for edge-equipped vehicles that are a plurality of vehicles equipped with the edge devices, the edge device and the other edge devices each having a core function execution unit communicating with the first management unit and an application execution unit communicating with the second management unit, the second management unit being configured to: collect the vehicle data from the first management unit, when an event notification transmitted from the edge devices of registered vehicles that are the subject vehicle and one of more of the edge-equipped vehicles and have been registered is received; identify a position of an edge-equipped vehicle, which has stopped and is one of the registered vehicles in which an event involving the edge-equipped vehicle of the plurality of vehicles has occurred, according to identification information indicated in the event notification and the vehicle data collected by the first management unit; set a geofence with reference to the position of the having-stopped edge-equipped vehicle; select, from among the registered vehicles that are within the geofence, notification destinations of information in association with the event using the geofence and the vehicle data collected by the first management unit; and transmit, to each of the selected notification destinations, an alert notification for calling attention according to type information indicated in the event notification, the program, when executed by a computer of the edge device, causing the computer to:

with the core function execution unit, collect the vehicle data including position information of the subject vehicle, and a state of the subject vehicle when the subject vehicle stops;

provide the vehicle data to the first management unit;

detect occurrence of the event; and with the application execution unit, transmit, to the second management unit, the event notification including the identification information for identifying the subject vehicle and the type information indicating a type of the event;

wherein the second management unit is configured to variably set at least one of a size and a shape of the geofence according to the type information.

18. An information notification system, comprising:

a management device including a first management unit having a first processor and memory and a second management unit having a second processor and memory;

and a plurality of edge devices mounted in a plurality of vehicles;

wherein:

each of the edge devices includes a third processor and memory configured to implement:

a data providing unit configured to collect vehicle data including position information of an edge-equipped vehicle that is equipped with the edge device, and a state of the edge-equipped vehicle, and provide the vehicle data to the first management unit; and an event transmission unit configured to detect occurrence of a preset event involving the edge-equipped vehicle and transmit, to the second management unit, an event notification including identification information for identifying the edge-equipped vehicle and type information indicating a type of the event;

the first processor and memory of the first management unit are configured to implement a storage unit configured to store the vehicle data repeatedly acquired from each of the edge devices, and the second processor and memory of the second management unit are configured to implement:

a data collection unit configured to collect the vehicle data stored in the storage unit from the first management unit;

a receiving unit configured to receive the event notification transmitted from each of the edge devices of registered vehicles, which are one or more of the edge-equipped vehicles and have been registered;

a geofence setting unit configured to (i) identify a position of the edge-equipped vehicle, which is one of the registered vehicles to which the event has occurred, according to the identification information indicated in the event notification and the vehicle data collected by the data collection unit, when the event notification is received, and (ii) set a geofence to include the position of the edge-equipped vehicle;

a notification destination selection unit configured to select, from among the registered vehicles that are within the geofence, notification destinations of information in association with the event using the geofence set by the geofence setting unit and the vehicle data collected by the data collection unit; and a notification unit configured to transmit, to each of the notification destinations selected by the notification destination selection unit, an alert notification for calling attention according to the type information indicated in the event notification; and the management device receives information corresponding to the alert notification from the edge device selected as a notification destination by the notification destination selection unit.

* * * * *